US012198548B1

(12) United States Patent
Kennedy et al.

(10) Patent No.: US 12,198,548 B1
(45) Date of Patent: *Jan. 14, 2025

(54) SYSTEM AND METHOD TO GENERATE POSITION AND STATE-BASED ELECTRONIC SIGNALING FROM A VEHICLE

(71) Applicant: Platform Science, Inc., San Diego, CA (US)

(72) Inventors: John C. Kennedy, San Diego, CA (US); Don Son, San Diego, CA (US); Scott Kopchinsky, San Diego, CA (US)

(73) Assignee: Platform Science, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,197

(22) Filed: Sep. 18, 2023

Related U.S. Application Data

(63) Continuation of application No. 17/877,753, filed on Jul. 29, 2022, now Pat. No. 11,769,407, which is a continuation of application No. 17/307,947, filed on May 4, 2021, now Pat. No. 11,438,938, which is a continuation-in-part of application No. 16/927,231, filed on Jul. 13, 2020, now Pat. No. 11,197,330, which is a continuation-in-part of application No. 16/870,955, filed on May 9, 2020, now Pat. No. 11,330,644, and a continuation-in-part of application No. 16/664,906, filed on Oct. 27, 2019, now Pat. No. 10,803,682, said application No. 16/870,955 is a continuation-in-part of application No. 16/416,396, filed on May 20, 2019, now Pat. No. 10,652,935, which is a continuation-in-part of application No. 16/118,436, filed on Aug. 31, 2018, now Pat. No. 10,334,638, which is a continuation of application No. 15/917,633, filed on Mar. 11, 2018, now Pat. No. 10,070,471, said application No. 16/664,906 is a continuation of application No. 15/859,380, filed on Dec. 30, 2017, now Pat. No. 10,475,258, said application No. 15/917,633 is a continuation of (Continued)

(51) Int. Cl.
*G06F 15/16* (2006.01)
*G08G 1/127* (2006.01)
*H04W 4/029* (2018.01)
*H04W 4/40* (2018.01)

(52) U.S. Cl.
CPC ............ *G08G 1/127* (2013.01); *H04W 4/029* (2018.02); *H04W 4/40* (2018.02)

(58) Field of Classification Search
CPC ......... G08G 1/127; H04W 4/029; H04W 4/40
See application file for complete search history.

(56) References Cited

U.S. PATENT DOCUMENTS

| | | | | |
|---|---|---|---|---|
| 2012/0166080 A1* | 6/2012 | Hung | ................... | G08G 1/0175 701/466 |
| 2014/0309892 A1* | 10/2014 | Ricci | .................... | B60W 50/10 701/49 |

\* cited by examiner

*Primary Examiner* — Normin Abedin
(74) *Attorney, Agent, or Firm* — Clause Eight; Michael Catania

(57) ABSTRACT

A system and method for using a mobile device to capture the proper execution of a series of one or more tasks with pre-assigned constraints that are associated with a specific set of assets, where those assets have certain known physical attributes and characteristics and are configured in a known manner is disclosed herein. The assets are preferably vehicles such as trucks.

3 Claims, 18 Drawing Sheets

Related U.S. Application Data application No. 15/624,814, filed on Jun. 16, 2017, now Pat. No. 9,961,710, said application No. 15/859,380 is a continuation-in-part of application No. 15/624,814, filed on Jun. 16, 2017, now Pat. No. 9,961,710.

(60) Provisional application No. 63/020,525, filed on May 5, 2020, provisional application No. 62/441,298, filed on Dec. 31, 2016, provisional application No. 62/441,290, filed on Dec. 31, 2016, provisional application No. 62/441,315, filed on Dec. 31, 2016, provisional application No. 62/352,014, filed on Jun. 19, 2016.

SYSTEM AND METHOD TO GENERATE POSITION AND STATE-BASED ELECTRONIC SIGNALING FROM A VEHICLE

CROSS REFERENCES TO RELATED APPLICATIONS

The Present Application is a continuation application of U.S. patent application Ser. No. 17/877,753, filed on Jul. 29, 2022, which is a continuation application of U.S. patent application Ser. No. 17/307,947, filed on May 4, 2021, now U.S. Pat. No. 11,438,938, issued on Sep. 6, 2022, which claims priority to U.S. Provisional Patent Application No. 63/020,525, filed on May 5, 2020, and U.S. patent application Ser. No. 17/307,947 is also a continuation-in-part application of U.S. patent application Ser. No. 16/927,231, filed on Jul. 13, 2020, now U.S. Pat. No. 11,197,330, issued on Dec. 7, 2021, which claims priority to U.S. Provisional Patent Application No. 62/873,922, filed on Jul. 14, 2019, and U.S. patent application Ser. No. 16/927,231 is a continuation-in-part application of U.S. patent application Ser. No. 16/870,955, filed on May 9, 2020, now U.S. Pat. No. 11,330,644, issued on May 10, 2022, which is a continuation-in-part application of U.S. patent application Ser. No. 16/416,396, filed on May 20, 2019, now U.S. Pat. No. 10,652,935, issued on May 12, 2020, which is a continuation-in-part application of U.S. patent application Ser. No. 16/118,436, filed on Aug. 31, 2018, now U.S. Pat. No. 10,334,638, issued on Jun. 25, 2019, which is a continuation application of U.S. patent application Ser. No. 15/917,633, filed on Mar. 11, 2018, now U.S. Pat. No. 10,070,471, issued on Sep. 4, 2018, which is a continuation application of U.S. patent application Ser. No. 15/624,814, filed on Jun. 16, 2017, now U.S. Pat. No. 9,961,710, issued on May 1, 2018, which claims priority to U.S. Provisional Patent Application No. 62/352,014, filed on Jun. 19, 2016, and U.S. patent application Ser. No. 16/927,231 is a continuation-in-part application of U.S. patent application Ser. No. 16/664,906, filed on Oct. 27, 2019, now U.S. Pat. No. 10,803,682, issued on Oct. 13, 2020, which is a continuation application of U.S. patent application Ser. No. 15/859,380, filed on Dec. 30, 2017, now U.S. Pat. No. 10,475,258, issued on Nov. 12, 2019, which is a continuation-in-part application of U.S. patent application Ser. No. 15/624,814, filed Jun. 16, 2017, now U.S. Pat. No. 9,961,710, issued on May 1, 2018, which claims priority to U.S. Provisional Patent Application No. 62/352,014, filed on Jun. 19, 2016, and U.S. patent application Ser. No. 15/859,380 claims priority to U.S. Provisional Patent Application No. 62/441,290, filed on Dec. 31, 2016, U.S. Provisional Patent Application No. 62/441,298, filed on Dec. 31, 2016, and U.S. Provisional Patent Application No. 62/441,315, filed on Dec. 31, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to utilizing data and computational information from on-vehicle and off-vehicle sources.

Description of the Related Art

The prior art discusses various techniques for wireless networks for vehicles.

U.S. Pat. No. 9,215,590 for Authentication Using Vehicle Data Pairing discloses the wireless pairing of a portable device with an on-board computer of a vehicle for authenticating a transaction with a third party.

General definitions for terms utilized in the pertinent art are set forth below.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

Electronic logging devices (ELD) and electronic on-board recorders (EOBR) are devices used on commercial motor vehicles to determine a position of the vehicle.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Memory generally includes any type of integrated circuit or storage device configured for storing digital data including without limitation ROM, PROM, EEPROM, DRAM, SDRAM, SRAM, flash memory, and the like.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

Processor generally includes all types of processors including without limitation microprocessors, general purpose processors, gate arrays, array processors, application specific integrated circuits (ASICs) and digital signal processors.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

There is a need for a better system to generate position and state-based electronic signaling from a vehicle.

BRIEF SUMMARY OF THE INVENTION

The present invention provides a system and method for using a mobile device to capture the proper execution of a series of one or more tasks with pre-assigned constraints that are associated with a specific set of assets, where those assets have certain known physical attributes and characteristics and are configured in a known manner.

One aspect of the present invention is a system for capturing the proper execution of a series of one or more tasks with pre-assigned constraints that are associated with one or more assets, wherein the assets comprise a plurality of certain physical attributes and characteristics in a known configuration. The system comprises a mobile device comprising: wireless connectivity, with Radio Frequency capabilities that include one of more of WiFi, Bluetooth, 3G/LTE/5G, GPS or their variations and/or evolutions; onboard processing; storage; touch or voice to text input; Sensors that may include one or more of movement, thermal, pressure, moisture, vibration sensing capabilities; and position detecting equipment to include one or more of gyroscopes, accelerometer, magnetometer or other compass heading sources capable of computing positioning in 3 axis, changes to position in 3 axis, distance and path taken as changes are being computed.

Another aspect of the present invention is a method of using a mobile device to capture the execution of a series of one or more tasks with pre-assigned constraints that are associated with a specific set of assets, where those assets have certain known physical attributes and characteristics in a known configuration.

Yet another aspect of the present invention a non-transitory computer-readable medium that stores a program that causes a processor to perform functions for using a mobile device to capture the execution of a series of one or more tasks with pre-assigned constraints that are associated with a specific set of assets, where those assets have certain known physical attributes and characteristics in a known configuration.

Yet another aspect of the present invention is a method for performing an electronic driver verification inspection report for an asset.

Yet another aspect of the present invention is a system to generate position and state-based electronic signaling from a vehicle. The system comprises a vehicle, a computing module connected to a data bus and a plurality of on-board sensors of the vehicle, a processor, and at least one position capturing device. The processor is configured to report a vehicle's sequential arrival at a plurality of user-selected reference points along a known ground path selected from at least one authorized database. The vehicle's location is sequentially reported by the at least one position capturing device; and a plurality of sensor readings at any time and at any interval defined by the user-selected reference points. The processor is configured to report the sequential arrival at the plurality of user-selected reference points in a format of ascending or descending values, wherein ascension or descension is determined by the number of user-defined increments away from a specific user-selected geospatial zero point along the pre-selected known route selected from an authorized database.

Yet another aspect of the present invention is a method of reporting position and state-based electronic signaling from a vehicle. The method comprises reporting a vehicle's sequential arrival at a plurality of user-selected reference points along a known ground path selected from at least one authorized database, as described by: (a) the vehicle's location as reported by at least one position capturing device; and (b) a plurality of sensor readings at any time and at any interval defined by the user-selected reference points. The method also includes reporting the sequential arrival at the plurality of user-selected reference points in a format of ascending or descending values, where ascension or descension is determined by the number of user-defined increments away from a specific user-selected geospatial zero point along the pre-selected known route selected from an authorized database.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
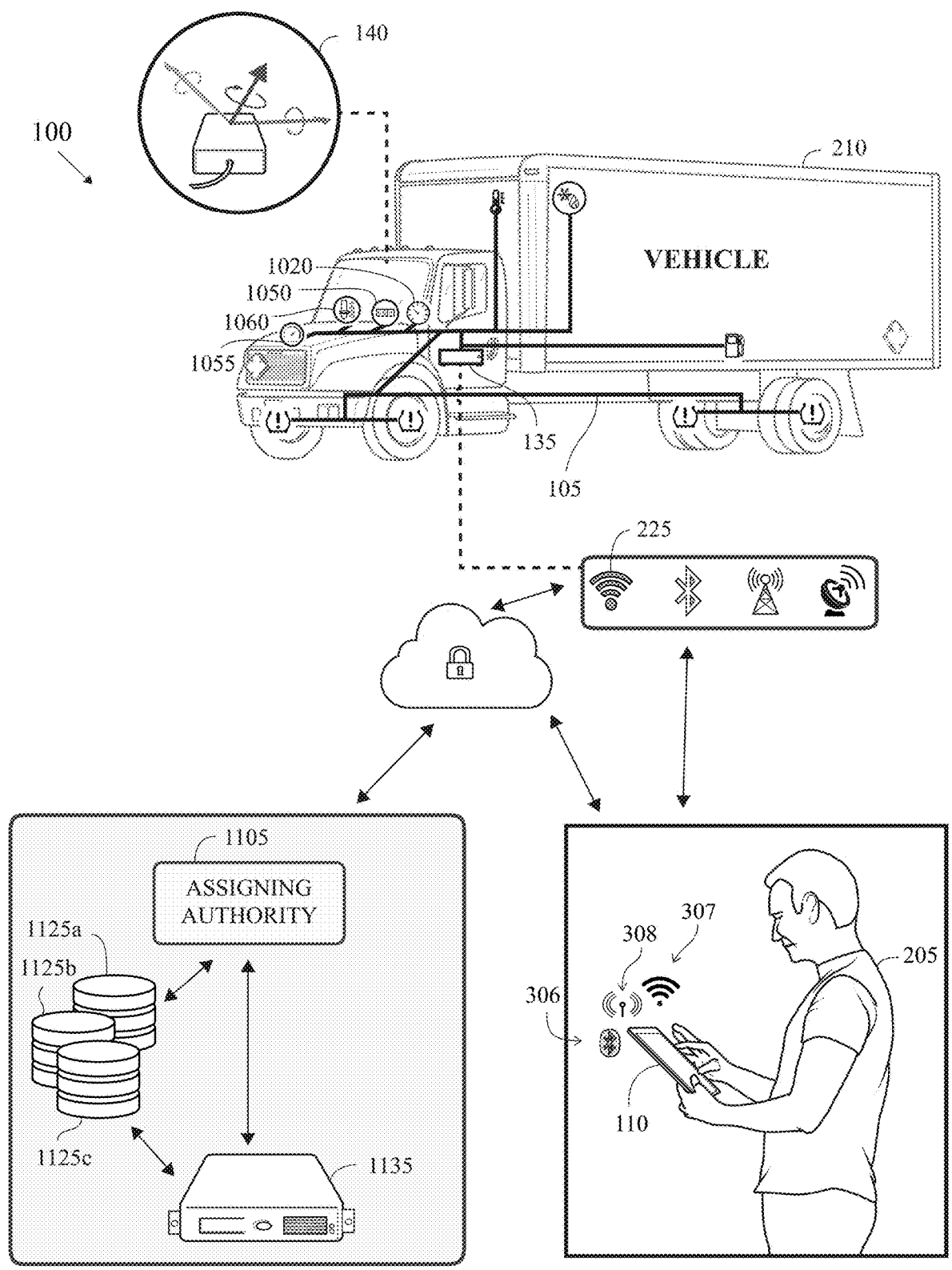
FIG. 1 is a block diagram of a system to generate position and state-based electronic signaling from a vehicle.

The system comprises a vehicle, a computing module connected to the vehicle's data bus and onboard sensors including but not limited to the Odometer, RPM indicator, Gear Position, and Speedometer, and that is capable of generating and maintaining a secure wireless network on the vehicle to connect to authorized mobile devices and off the vehicle to connect to authorized WiFi, Bluetooth and LTE networks and devices, and one or more of the following position capturing technologies; GPS, Accelerometer, or magnetometer.

The system may also interact with authorized databases containing reference source information that will be compared to dynamically generated information provided by one or more of the vehicle's connected computing modules and/or authorized wireless devices connected to the secure onboard network.

The method involves comparing an on-vehicle re-creation of a vehicle's traveled ground path as described by: (a) its' location as reported by one or more of GPS derived, Magnetometer, Accelerometer, Odometer and Speedometer derived, or hybrid calculated values; (b) sensor readings at any time and at any interval that location is collected as described by a user generated set of reporting conditions and intervals; and, (c) reporting those ground path descriptions in a format that is represented by a linear, logarithmic, or geometrically scaled set of ascending or descending values, where ascension or descension is determined by the number of user-defined increments away from a specific user selected geospatial "0" point, to a pre-selected route selected from an authorized database by the assigning authority.

The method may also involve utilizing an authorized database of known ground paths to direct a route to an identified endpoint, which may be either a permanent or non-permanent endpoint (Examples of permanent endpoints include gas stations, loading docks and warehouses. Examples of non-permanent endpoints include construction sites and staging areas).

The following definitions are used herein:

"Assignment": One or more tasks, that in total are the GROUP OF TASKS and the TASK ASSETS.

"Group of Tasks" consist of one or more discrete jobs which require operator input and are bound by a set of constraints that include but are not limited to time, location and specific action completions.

"Task Assets" are one or more physical assets with certain physical attributes known to the Assignment, that are configured in a manner that is known to the Assignment, and whose configuration and known physical attributes associated with the temporal configuration existing during the time the Group of Tasks are being executed, can be used to calculate constraints to the execution of the group of tasks.

"Approved Mobile Computing Device": An Approved Mobile Computing Device (AMCD) is a device that contains: (a) wireless connectivity, with Radio Frequency capabilities that include one of more of WiFi, Bluetooth, 3G/LTE/5G, GPS or their variations and/or evolutions; (b) onboard processing; (c) storage; (d) optional human interfaces to include touch or voice to text input; (e) Sensors that may include one or more of movement, thermal, pressure, moisture, vibration sensing capabilities; and (f) positional detecting equipment to include one or more of gyroscopes, accelerometer, magnetometer or other compass heading sources capable of computing positioning in 3 axis, changes to position in 3 axis, distance and path taken as changes are being computed.

"Validated Source": A validated source includes but is not limited to a capability to: validate in real time that the Task Assets being evaluated are geographically co-located with the AMCD within Assigning Authority configured proximity definitions; contemporaneously validate during the period of Assignment completion specific information such as the vehicle identification number, serial number, or other discrete high-confidence identifying information that confirms that the assets being evaluated are the appropriate discrete assets identified in the Assignment, and no others.

"Initial Position": Initial Position (IPOS) is the position described when an Operator selects "Initialize" and is generated by polling and combining information provided by one or more available onboard sensors and/or sources to include a. GPS, b. Accelerometer, c. Magnetometer and/or other sources of Cardinal Heading information, d. Radio Frequency position as determined by Decibel and Radial from a known fixed emitting source.

"Position Engine": Utilizing the capabilities of the AMCD and capturing Sequence Positions.

"Initial Execution Constraints": Those items that must be satisfied before the Operator can begin satisfying the Assigning Authority assigned tasks. Conditions are configurable by the Assigning Authority, but may include conditions such as Vehicle or Task Asset(s) position or state, Driver status, and AMCD state, and Assignment Initialization status.

Sequence Position:

Terminal Position:

Preparation for Operation

A temporal Assignment is generated by an Assigning Authority Assignment is composed of:

One or more Task Assets, which have accessible "asset profiles" that include descriptions of one or more of the following: a. physical characteristics b. points of interest, c. instructions, and/or d. additional information.

One or more Task Asset configurations, where more than one Asset is included in the Assignment, and there are known and/or expected combinations of those Assets that yield combined geometries or other characteristics relevant to the boundary conditions associated with task completion.

One or more "Tasks," where tasks are described as sets of activities that an operator must complete based on a set of know constraints and measurable actions.

Assignment is delivered to an AMCD that is associated with an Operator selected by the Assigning Authority to complete the Assignment.

Assignment becomes executable when the Assignment's INITIAL EXECUTION CONSTRAINTS are satisfied.

Operational Function and Execution

"START": Operator INITIALIZES AMCD by selecting operator accessible INITIALIZE command. When initializing is complete, START button becomes functional.

Operator selects START command through positive confirmation and begins ASSIGNMENT.

As Operator changes the location, position and orientation of the AMCD, the AMCD begins capturing and storing changes from INITIAL POSITION to include: Accelerometer state, and one or more of the following: Magnetometer and/or other Compass heading source data current position information; Decibel and bearing information from a known Radio Frequency Source ("RF Source").

At configurable intervals, these changes are combined to create discrete SEQUENCE POSITIONS which describe a series of positions using data generated by 1, 1.1, 1.2 at any discrete point in time, with a naming convention that allows these positions to be reassembled at any time subsequent to their capture (e.g., an ascending alphanumeric naming convention), in an order that replicates the geospatial position of the AMCD at the time of the capture of each Sequence Position.

When Accelerometer indicates change from Initial Position Accelerometer State, the Device begins storing Accelerometer and changes based on configurable user specified increments. Changes from that position are calculated using:
  MOVE
  MEASURE
  CAPTURE
  REPEAT
  COMPLETE
  a. sequential changes in Magnetometer or other Compass heading source;
  b. changes in signal strength and bearing from a known RF source.

Assignment—Combine Tasks with elements from DBs, create temporal bounds, constraints, rules.

Tasks
  Task DB
  Configurable Tasks
  Databases
Asset DB
  Vehicle
  Trailer
  Accessory Asset Configuration—Combination of assets selected from Database, and known geometric combination(s) of those assets.

Is Asset Inspection Configuration "DEFAULT"?
Yes/No
If "Yes"
  Pathway Defined
  Envelope Defined
  Sequence Defined
  Operator Initiates Assignment
  Position Engine real time processing
  Position Engine feeds Task engine (where applicable and default)
  Task initiation executed by driver, or prompted by AMCD when default is validated
  Task execution compared to task requirement list and validated/in-validated in real time if default, or subset of defaults. If no default conditions available, info stored
  Task completion defined when tasks are exhausted, and/or Operator indicates Assignment complete
  Completed task list path and execution performance compared to Assignment requirements for validation.
  If complete, Operator receives "Completion" confirmation
  If not complete, incomplete tasks are identified and remedial actions described
  Operator completes remedial actions until Assigning Authority conditions satisfied
  When Satisfies "Complete" confirmation made available to Operator.
If "No"
  Pathway="Null"
  Envelope="Null"
  Sequence Defined
  Operator Initiates Assignment
  Position Engine real-time processing of Operator activity
  Position Engine feeds Task engine (where applicable and default)="null"
  Task initiation executed by driver, or prompted by AMCD when default is validated="null"
  Driver Initiates Task through AFFIRMATIVE ACTION
  Task execution compared to task requirement list and validated/in-validated in real time if default, or subset of defaults. If no default conditions available, info stored (validates which ever values can be satisfied without knowing the path)
  Initial Task Completion defined when a. tasks are exhausted, and/or b. Operator indicates Assignment complete through positive confirmation action
  Completed task list path and execution performance compared to Assignment requirements for validation.
  Completed path list is compared to configuration library and "best fit" to account for changes in geometry from DEFAULT GEOMETRY
  If "BEST FIT PATH" satisfies conditions for tasks, those tasks are validated
  If "BEST FIT PATH" does not satisfy task conditions, those tasks are identified with remedial actions indicated
  Operator executes remedial actions until all actions are complete, or driver "opts out" of task where applicable as defined by Assigning Authority
Final Completion and "Opt Out" Report Completed
  If complete, Operator receives "Final Completion" confirmation
  If not complete, incomplete tasks are identified and remedial actions described Operator completes remedial actions until Assigning Authority conditions satisfied When Satisfies "Complete" confirmation made available to Operator.

In one embodiment, a system comprises an assigning authority engine, a remote profile manager toolset, databases, cloud sources, a vehicle and a CVD within the vehicle. The contents of each of the databases are accessible and combinable by the assigning authority to produce dynamic, temporal combinations of data elements and instructions for the vehicle. The assigning authority is configured to use the remote profile manager toolset to execute the dynamic, temporal combinations. The dynamic, temporal combinations access data from the cloud sources comprising third party data and vehicle, timing, event, and/or positioning ("VTEP") data to inform instruction sets delivered by the assigning authority. One or more elements of the VTEP data is used as the basis to synchronize timing between the data, or computational outputs of two or more sources of electronic information. A single coherent information picture is form from fusing data and computational information from on-vehicle and off-vehicle sources.

The cloud source comprises a telematics service provider cloud, an original equipment cloud (truck manufacturer, Tier 1 supplier, device supplier and the like), a customer cloud (end user) and a public cloud.

The system also includes infrastructure comprising at least one of a building, a gate, an access controlled point of entry, a parking structure, a weigh station, a toll collection structure, a fueling equipment and a vehicle service equipment.

Multiple vehicle connected mobility devices are used with the system 1600 and comprise at least one of a tablet computer, a mobile phone, a scanning device, a beacon, a RF passive or active communication device and a signature capture device.

Affiliates with the system include at least one of another vehicle authorized to share data via V2V, Cloud, or other RF communication protocols, a TMS system authorized by the assigning authority to directly take data from or provide data to the vehicle CVD, an authorized cloud provider, and an authorized user granted access by the assigning authority.

The vehicle is preferably one of a long-haul semi-truck, a bus, a sedan, a pick-up, a sports utility vehicle, a limousine, a sports car, a delivery truck, a van, or a mini-van.

The vehicle has multiple endpoints with direct connectivity to the CVD/vehicle, and require no routing through the Cloud. The endpoints are user interfaces or built in displays, devices connected through fixed or wireless connection to the vehicle's CVD, sensors connected through the vehicle bus to the CVD, or directly to the CVD via wired or wireless connection, like devices. The vehicle is a primary generator and source of VTEP data.

The RPM comprises a RPM sync for syncing with other devices, servers, Cloud, the CVD and the like.

Figure 1A:
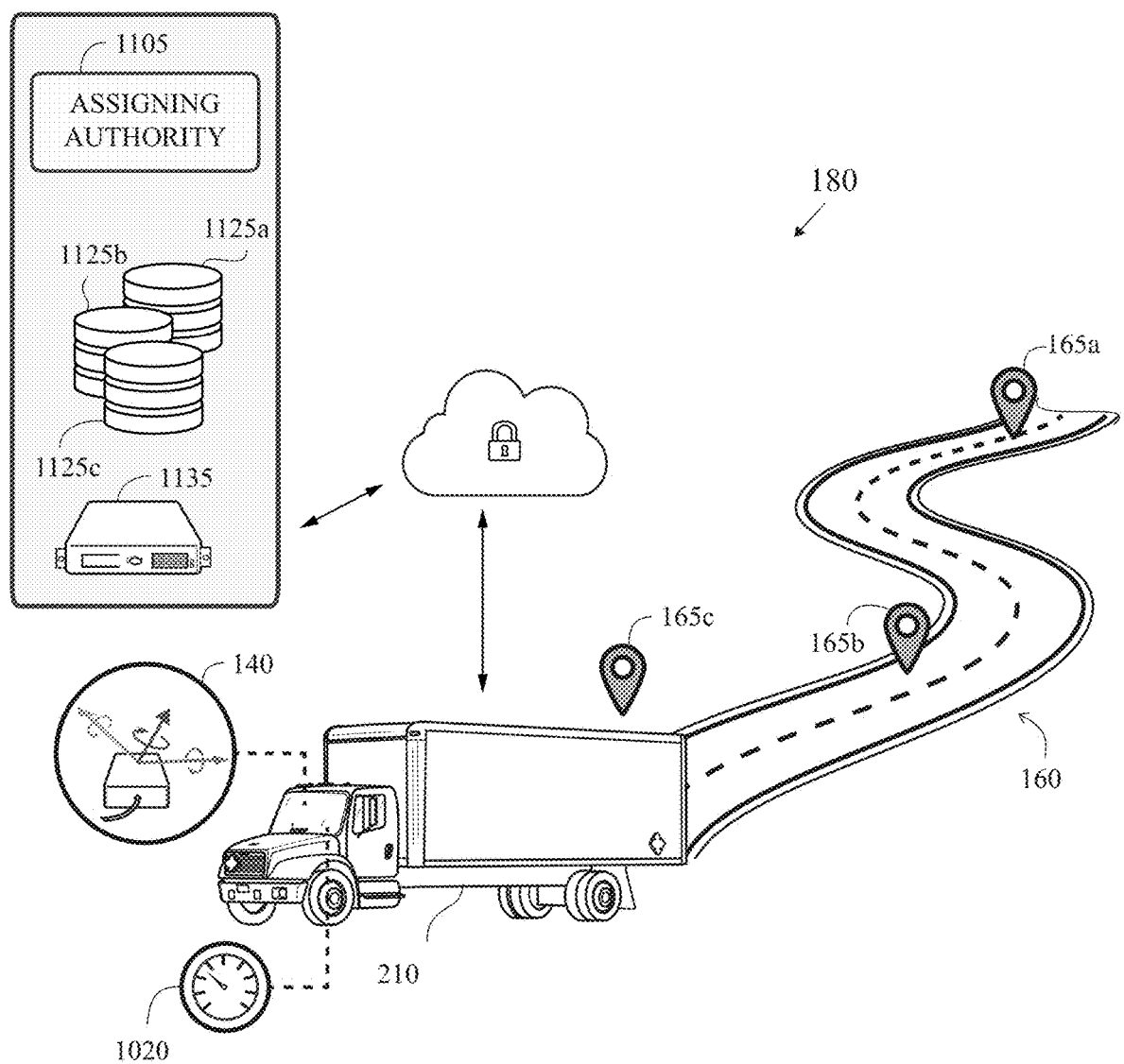
FIG. 1A is a block diagram of a system to generate position and state-based electronic signaling from a vehicle.

A system 100 for generating position and state-based electronic signaling from a vehicle is shown in FIG. 1 and FIG. 1A. The system 100 comprises a vehicle 210, a computing module 135 connected to a data bus 105 and a plurality of on-board sensors of the vehicle, an authorized mobile device 110, a server 1135, and at least one position capturing device 140.

The vehicle 210 is preferably a truck, however, those skilled in the pertinent art will recognize that the truck may be replaced by any type of vehicle (such as a bus, sedan, pick-up, sport utility vehicle, limousine, sports car, delivery truck, van, mini-van, motorcycle, and the like) without departing from the scope of spirit of the present invention. The truck preferably comprises a motorized engine, a vehicle identification number ("VIN"), an on-board computer with a memory and a connector plug. The on-board computer preferably has a digital copy of the VIN in the memory. The on-board computer is preferably in communication with the motorized engine. The truck may also have a GPS component for location and navigation purposes, a satellite radio such as SIRIUS satellite radio, a driver graphical interface display, a battery, a source of fuel and other components found in a conventional long distance truck.

Also in the truck 210 is a CVD 135 comprising a processor, a WiFi radio, a BLUETOOTH radio, a memory and a connector to connect to the connector plug of the on-board computer. The CVD 135 is connected to a data bus 105 and to on-board sensors of the vehicle 210.

The on-board sensors of the vehicle/truck 210 preferably comprises an odometer 1050, a RPM indicator 1055, a gear position 1060, and a speedometer 1020. Those skilled in the pertinent art will recognize that multiple other sensors may be utilized without departing from the scope and spirit of the present invention.

Also in the truck 210 is at least one positioning capturing device 140, preferably comprising at least one of a GPS derived, magnetometer, accelerometer, odometer and speedometer derived, or hybrid calculated values.

A driver 205 preferably has a mobile communication device such as a tablet computer 110 in order to pair with a secure wireless network 225 generated by the CVD 135 of the truck. The tablet computer 110 preferably comprises a graphical user interface 335, a processor 310, a WiFi radio 307, a BLUETOOTH radio 306, and a cellular network interface 308.

The system 180 includes a server 1135 configured to compare an on-vehicle re-creation of a vehicle's traveled ground path 160 as described by: the vehicle's location 165a-165c as reported by the at least one position capturing device 140; and a plurality of sensor readings at any time and at any interval that location is collected as described by a user generated set of reporting conditions and intervals.

The server 1135 is also preferably configured to report the plurality of ground path descriptions in a format that is represented by a linear, logarithmic, or geometrically scaled set of ascending or descending values, wherein ascension or descension is determined by the number of user-defined increments away from a specific user selected geospatial zero point, to a pre-selected route selected from an authorized database 1125 by the assigning authority 1105.

The assigning authority engine 1105 authorizes actions for the vehicle 210.

Furthermore, the system 180 is configured to interact with authorized databases 1125a-1125c containing reference source information that will be compared to dynamically generated information provided by one or more of the vehicle's connected computing modules and/or authorized wireless devices connected to the secure onboard network.

Figure 1B:
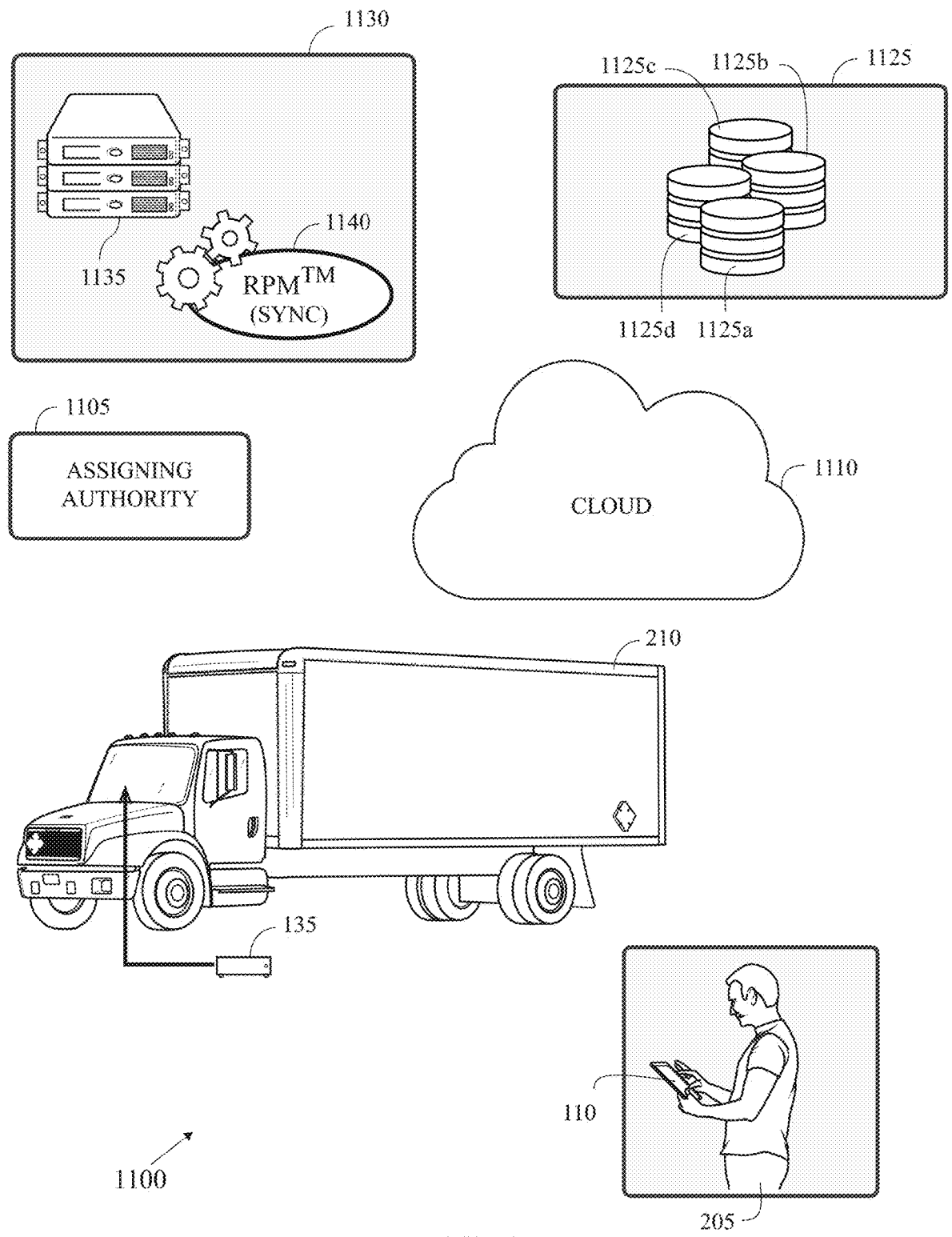
FIG. 1B is a block diagram of a system to generate position and state-based electronic signaling from a vehicle.

FIG. 1B is a block diagram of a system 1100 for generating position and state-based electronic signaling from a vehicle. The system 1100 includes a vehicle 210, an assigning authority engine 1105, a remote profile manager (RPM) toolset 1130 with an RPM sync program 1140, and a plurality of databases 1125, both accessible through the cloud 1110. A vehicle 210 preferably includes a CVD 135. The remote profile manager toolset 1130 preferably includes a server 1135. The plurality of databases 1125 is preferably composed of multiple databases 1125a-d.

The assigning authority engine 1105 preferably has a work assignment that has been generated for a specific vehicle 210. In a preferred embodiment, the assigning authority engine 1105 resides at a server for the system 1100, and the RPM toolset 1130 resides at a separate server. Alternatively, the assigning authority engine 1105 and the RPM toolset 1130 reside at the same server. The assigning authority engine 1105 is preferably configured to access and combine off-vehicle content and on-vehicle data, along with the work assignment, to produce dynamic, temporal combinations of data elements and instructions for the vehicle 210. Additionally, the assigning authority engine 1105 provides permission to various applications to share data for app-to-app integration. In one example, the assigning authority engine 1105 grants permission to a workflow application running on a mobile communication device for the vehicle 210 to obtain data from a navigation application running on the mobile communication device. The assigning authority engine 1105 instructs the navigation application to hare the data with the workflow application. In one specific example, the share data is GPS coordinates for the vehicle.

Figure 2:
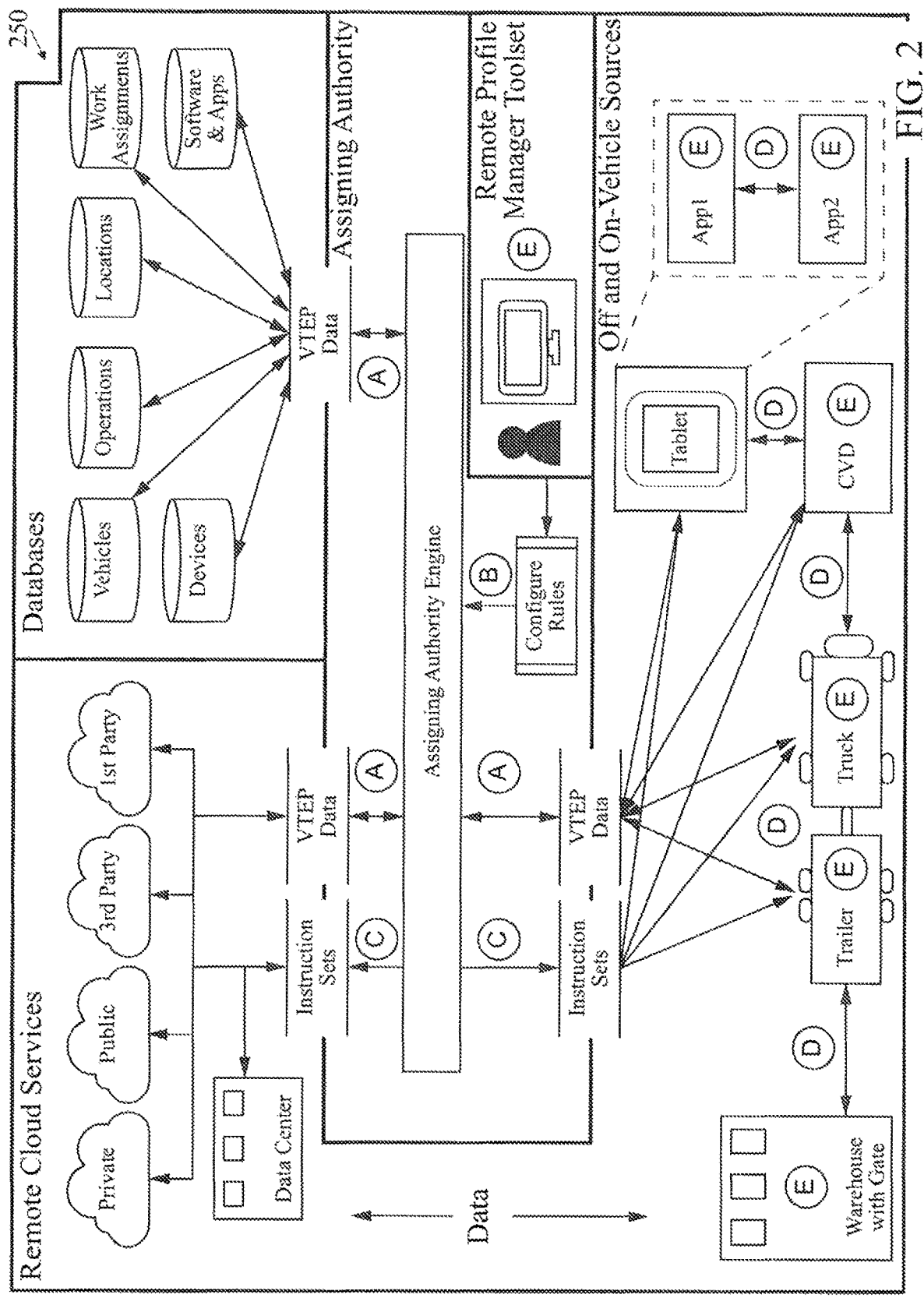
FIG. 2 is a block diagram of a system for remote profile management for utilizing data and computational information from on-vehicle and off-vehicle sources.

FIG. 2 is a block diagram of a system 250 for remote profile management for utilizing data and computational information from on-vehicle and off-vehicle sources. At step A, VTEP data is gathered from multiple databases, cloud services and other off-vehicle sources, as well as on-vehicle sources. At step B, the RPM toolset is used to configure multiple assigning authority rules based on the collected VTEP data. At step C, multiple instruction sets are delivered to multiple cloud services, other off-vehicle sources and on-vehicle sources. At step D, off-vehicle sources such as physical infrastructure, vehicles, mobile devices, and mobile device applications share data per the delivered instruction sets. At step E, back office managers, physical infrastructure, on-vehicle and off-vehicle sources are provided with new information data set combinations enabling novel processing capabilities for the system.

In one embodiment, the off-vehicle source is a mobile application operating on a mobile device, and the data originates from the mobile application.

In another embodiment, app to app integration is utilized to generate the information data set. The app to app integration is performed at a remote server, within an app on a mobile device, on a CVD or a combination thereof.

The cloud sources preferably comprise a public cloud source, a private cloud source, a hybrid cloud source, a multi-cloud source, a service provider cloud, a telematics service provider cloud, an original equipment manufacturer cloud (truck manufacturer, Tier 1 supplier, device supplier and the like), a customer cloud (end user) and/or a public cloud.

The system also preferably includes physical infrastructures with communication devices comprising at least one of a building, a gate, an access controlled point of entry, a parking structure, a weigh station, a toll collection structure, a fueling equipment and a vehicle service equipment. In one embodiment, a passive device on a physical structure broadcasts a unique ID which is received by a mobile device and a vehicle gateway device. If the passive device is a BLUETOOTH device, it broadcasts a BLUETOOTH advertisement.

Multiple vehicle connected mobility devices are preferably used with the system 250 and comprise at least one of a tablet computer, a mobile phone, a scanning device, a beacon, a RF passive or active communication device and a signature capture device.

Affiliates with the system 250 include at least one of another vehicle authorized to share data via vehicle-to-vehicle (V2V), Cloud, or other RF communication protocols, a TMS system authorized by the assigning authority engine 1105 to directly take data from or provide data to the vehicle CVD 135, an authorized cloud provider, and an authorized user granted access by the assigning authority.

The vehicle 210 is preferably one of a long-haul semi-truck, a bus, a sedan, a pick-up, a sports utility vehicle, a limousine, a sports car, a delivery truck, a van, or a mini-van.

Figure 3:
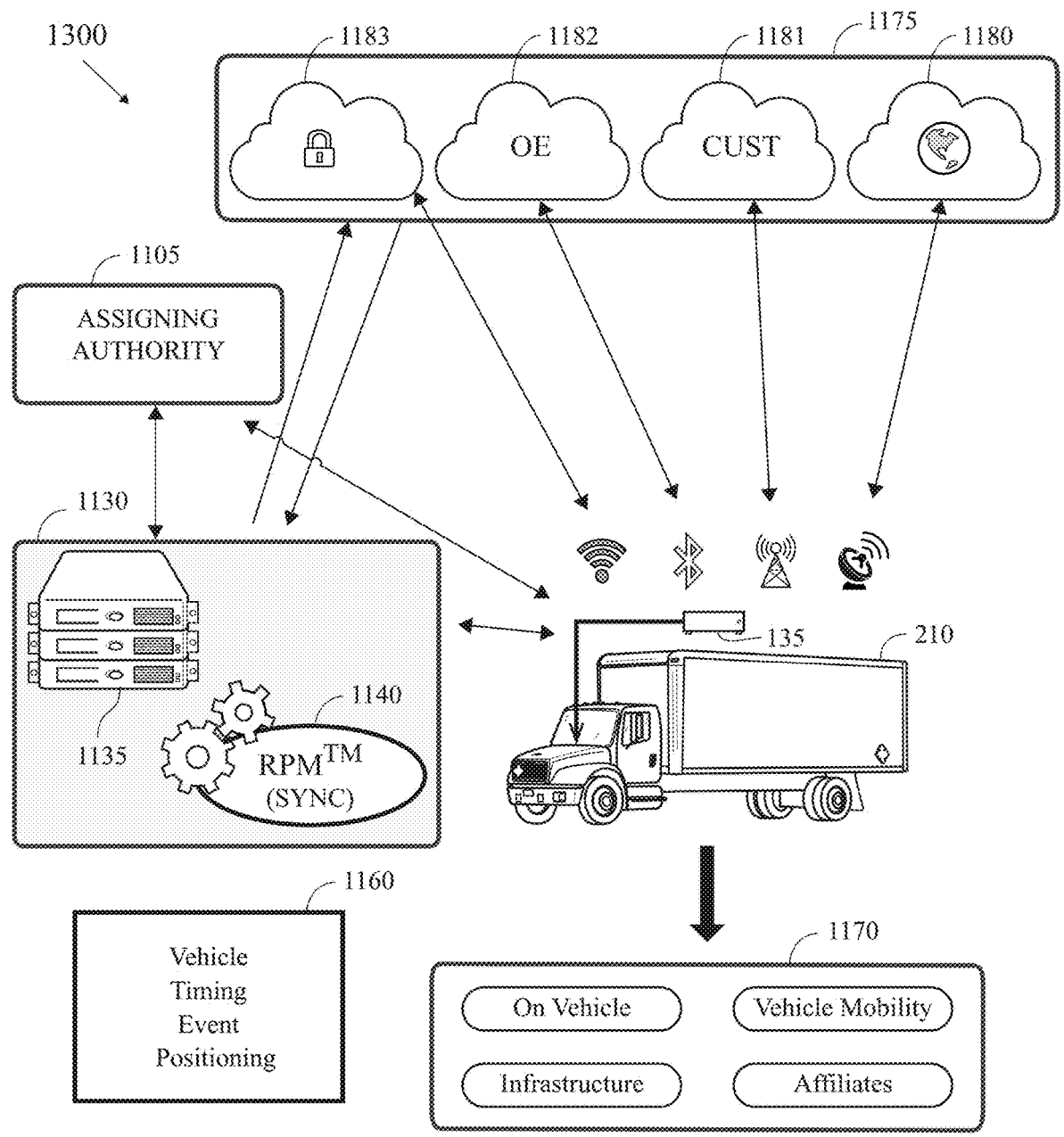
FIG. 3 is a block diagram of a system for remote profile management for utilizing data and computational information from on-vehicle and off-vehicle sources.

FIG. 3 is a block diagram of a system 1300 for remote profile management for utilizing data and computational information from on-vehicle and off-vehicle sources. As shown in FIG. 3, the system 1300 comprises an assigning authority engine 1105, a remote profile manager toolset 1130, databases (FIG. 2), cloud sources 1175, a vehicle 210 and a CVD 135 within the vehicle 210. The cloud sources include main protected server/cloud 1183, an original equipment manufacturer server/cloud 1182, a customer server/cloud 1181 and a public server/cloud 1180. Multiple other servers/clouds and/or databases can be utilized with the present invention without departing from the scope and spirit of the claims. The cloud sources 1175, databases, RPM 1130 and assigning authority engine 1105 communicate with the CVD 135 utilizing various wireless communication protocols including WiFi, cellular networks, BLUETOOTH, GPS, and the like. The contents of each of the databases (1125a-1125d) and cloud sources 1175 are accessible and combinable by the assigning authority engine 1105 to produce dynamic, temporal combinations of data elements and instructions for the vehicle 210. The assigning authority engine 1105 is configured to use the remote profile manager toolset 1130 to execute the dynamic, temporal combinations. The dynamic, temporal combinations access data from the cloud sources comprising third party data and vehicle, timing, event, and/or positioning ("VTEP") data 1160 to inform instruction sets delivered by the assigning authority engine 1105. The instruction sets are preferably temporal permission for the on-vehicle sources and off-vehicle sources (e.g., applications) to connect and share data with each other. One or more elements of the VTEP data 1160 is used as the basis to synchronize timing between the data, or computational outputs of two or more sources of electronic information. A single coherent information picture 1170 is formed from fusing data and computational information from the on-vehicle and the off-vehicle sources. The new information data set combination (single coherent information picture) is a display of information generated from the combination of data from the on-vehicle sources and the off-vehicle sources. The data set can include dynamic route information (road condition changes due to weather, construction and the like), an updated driver's profile, vehicle engine date, cargo data, dynamic compliance rules, micro-navigation data, fuel stop data, inspection stations on the route, wireless communications connectivity status, time to destination, and the like. An example of a new information data set combination is imparting GPS location data from a truck/CVD onto cargo (the potato chips example). The new information data set combination is preferably any new combination of the connected data sources data for the specific vehicle of interest.

As shown in FIG. 3, the vehicle 210 has multiple endpoints with direct connectivity to the CVD 135, and requires no routing through a cloud service. The endpoints are user interfaces or built in displays, devices connected through fixed or wireless connection to the vehicle's CVD 135, sensors connected through a vehicle bus 105 (see FIG. 4A)

to the CVD 135, or directly to the CVD 135 via wired or wireless connection, like devices. The vehicle 210 is preferably a primary generator and source of VTEP data 1160.

The RPM 1130 preferably comprises a RPM sync 1140 for syncing with other devices, servers, the Cloud, the CVD and the like.

The real-time data for the vehicle 210 preferably comprises a real-time speed of the vehicle, tire pressure values from a plurality of tire sensors, refrigeration/HVAC unit values, a plurality of fluid levels, a plurality of power unit values, a real-time fuel tank capacity, and a fuel type.

The plurality of configurable real-time vehicle data trigger events comprises a value outside of a predetermined range for the real-time data of the vehicle.

The real-time driver/operator profile comprises amount of time driving during a pre-determined time period, number of rest breaks during the pre-determined time period, license compliance data, physical disabilities and driving violations.

One example of an off-vehicle source is a fuel stop. A profile of a fuel stop preferably comprises real-time types of fuels available, set billing instructions, physical dimensions of a plurality of fuel pumps, GPS coordinates, hours of operation, food service availability, and resting area availability. The predetermined fueling time period is a time range to fuel the vehicle based on the real-time GPS location of the vehicle, the real-time speed of the vehicle, the distance to the selected fuel stop from the real-time GPS location of the vehicle, and the hours of operation of the fuel stop.

A configuration of the vehicle 210 is preferably selected from one of a single trailer, a dual trailer, a triple trailer, and a refrigeration trailer.

Another example of an off-vehicle source is a database (Federal, State local) with dynamic compliance rules. The dynamic compliance rules comprise speed limits, transport of toxic waste, the transport of refrigerated cargo, the rest durations for drivers/operators, the necessary insurance coverage, and the type of taxes and fees to be paid.

The workflow utilized by the assigning authority engine 1105 preferably comprises an origination location of the vehicle, a destination of the vehicle, a route to the destination, a cargo, a time of departure and a time of arrival.

In one non-limiting example, the assigning authority engine 1105 receives data over the cloud from a customer server 1181 that a shipment of bags of potato chips were damaged in transit. The assigning authority engine 1105 accesses a CVD 135 or mobile device for the vehicle that delivered the bags of potato chips to determine the origination location, the destination location and the route. The assigning authority engine 1105 uses a navigation app on the mobile device (tablet computer) to determine the route, and an elevation of the route. The assigning authority engine 1105 determines that the vehicle traveled over a high elevation mountain range that probably resulted in the damage to the bags of potato chips due to a pressure differential. The assigning authority engine 1105 uses this information to reroute a subsequent shipment of bags of potato chips to avoid the high elevation mountain range.

Figure 4:
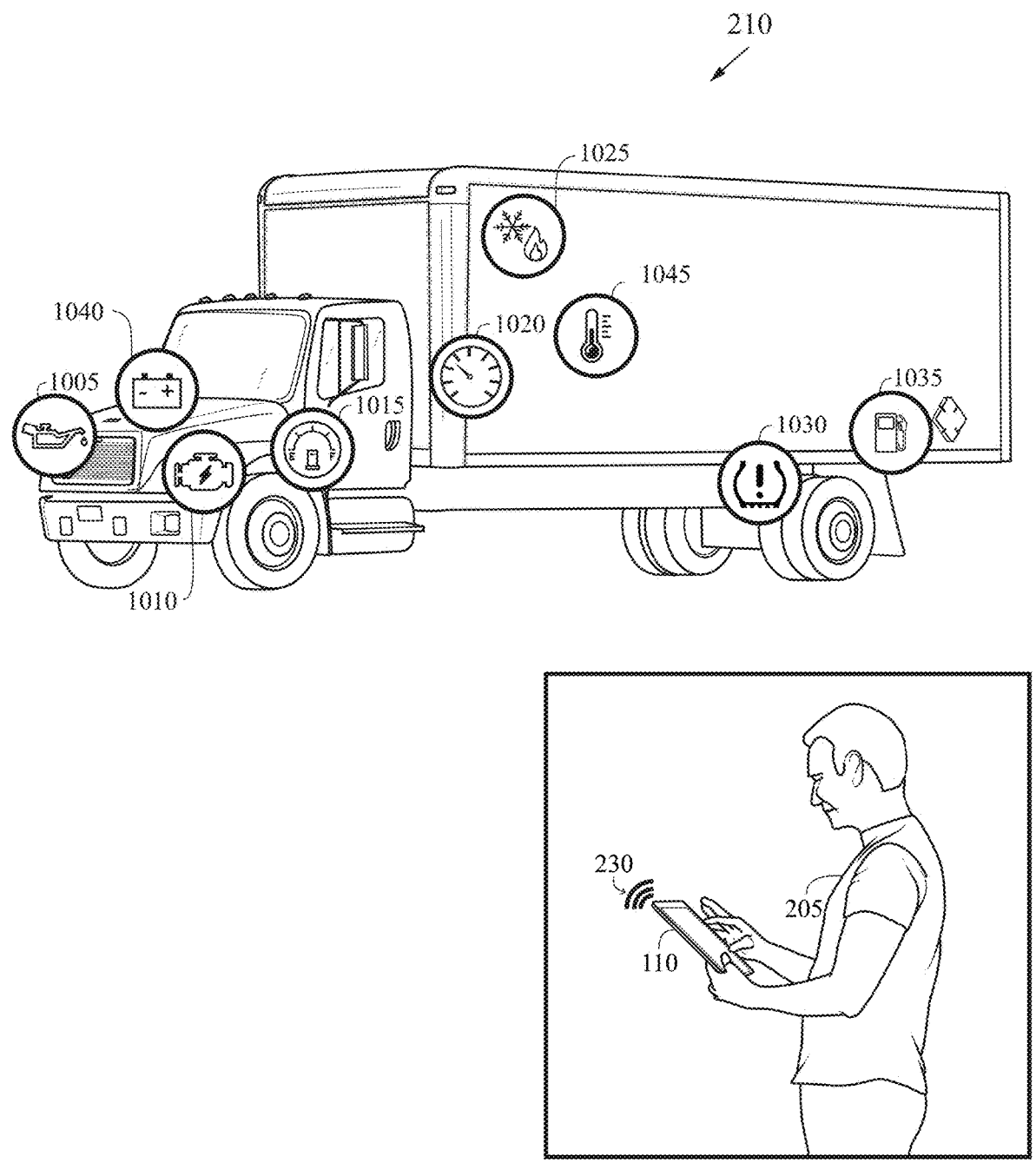
FIG. 4 is an illustration of multiple sensors on a truck.
Figure 4A:
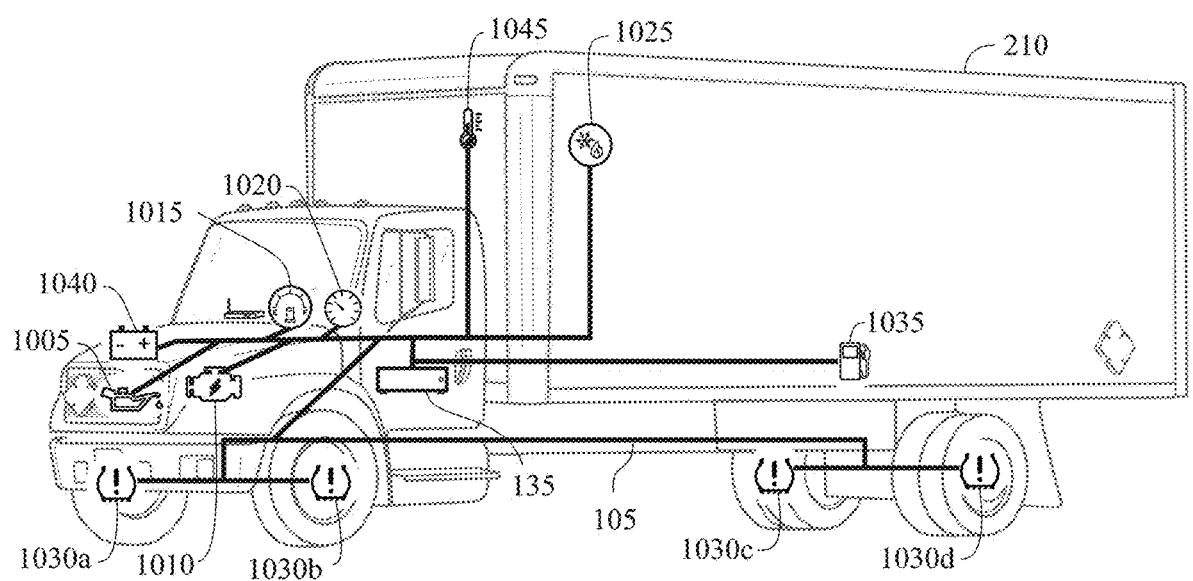
FIG. 4A is an illustration of multiple sensors on a truck connected to a BUS for the truck.

FIG. 4 is an illustration of multiple sensors on a truck 210. The vehicle/truck 210 preferably comprises an oil level sensor 1005, an engine sensor 1010, a power sensor 1040, a refrigeration/HVAC sensor 1025 a temperature sensor 1045, a tire pressure sensor 1030, a fuel sensor 1015, and a fuel type sensor 1035. Those skilled in the pertinent art will recognize that multiple other sensors may be utilized without departing from the scope and spirit of the present invention. FIG. 4A is an illustration of multiple sensors on a truck 210 connected to a data bus 105 for the truck. Each of the sensors (oil level sensor 1005, engine sensor 1010, a power sensor 1040, a refrigeration/HVAC sensor 1025, a temperature sensor 1045, tire pressure sensors 1030*a-d*, and fuel sensor 1015, and a fuel type sensor 1035) is preferably connected to the data bus 105 for transferring data to an on-board computer of the vehicle 210, or directly to the CVD 135. Alternatively, some or all of the sensors use wireless communications to communication with the CVD 135.

Figure 5:
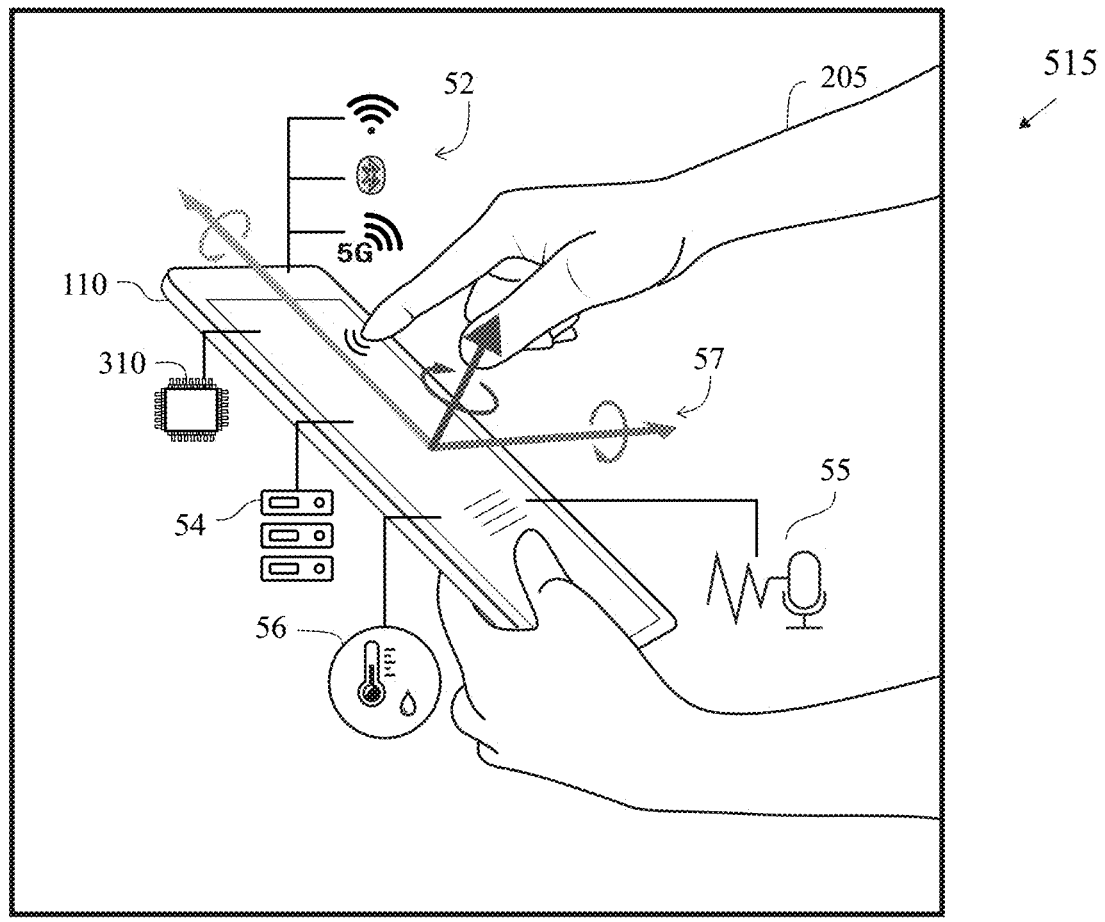
FIG. 5 is an isolated view of an operator using a mobile device for a vehicle inspection.

FIG. 5 is an isolated view 515 of an operator 205 using a mobile device 110 for a vehicle inspection. The mobile device 110 preferably comprises a processor 310, a memory 54, a thermistor 56, a speaker 55, an accelerometer 57, and wireless transceivers 52.

Figure 6:
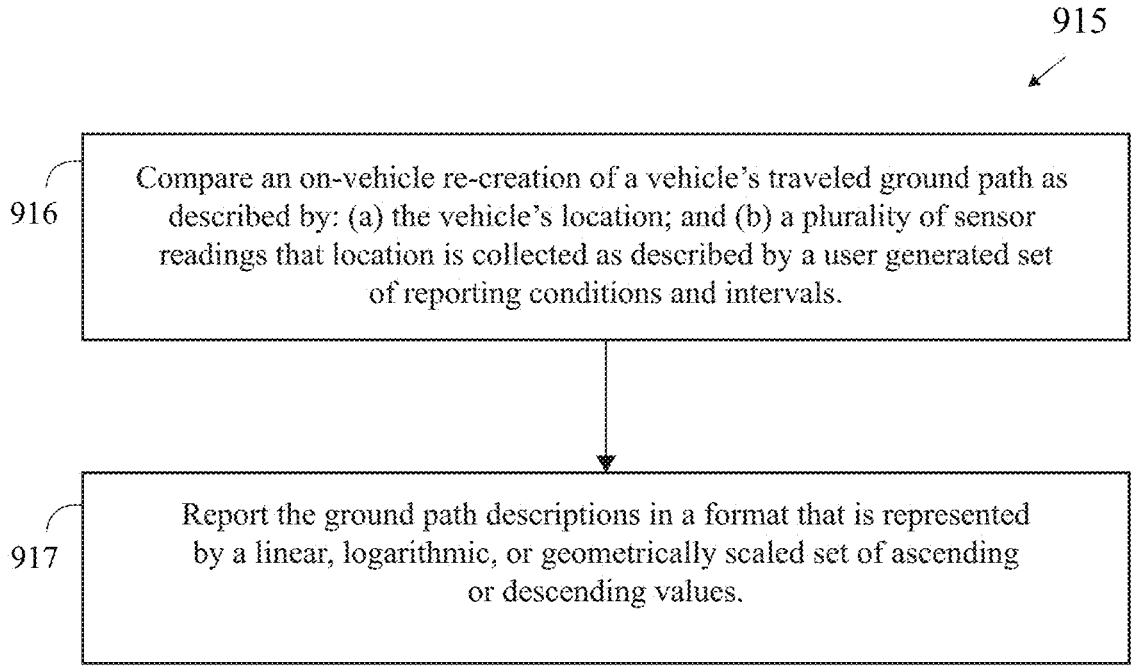
FIG. 6 is a flow chart for a method to generate position and state-based electronic signaling from a vehicle.

FIG. 6 is a flow chart for a method 915 for generating position and state-based electronic signaling from a vehicle. At block 916, compare an on-vehicle re-creation of a vehicle's traveled ground path as described by: (a) the vehicle's location as reported by at least one position capturing device; and (b) a plurality of sensor readings at any time and at any interval that location is collected as described by a user generated set of reporting conditions and intervals. At block 917, report the plurality of ground path descriptions in a format that is represented by a linear, logarithmic, or geometrically scaled set of ascending or descending values, where ascension or descension is determined by the number of user-defined increments away from a specific user selected geospatial zero point, to a pre-selected route selected from an authorized database by the assigning authority.

Figure 7:
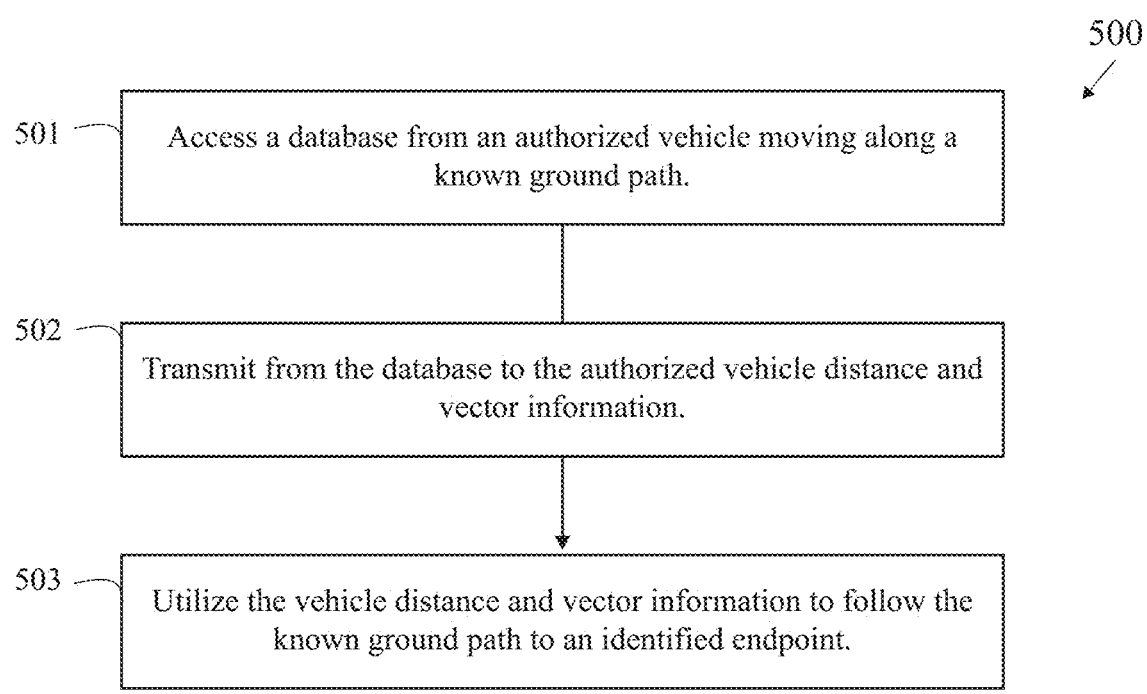
FIG. 7 is a flow chart for a method for providing positioning data to a vehicle moving along a known ground path.

FIG. 7 is a flow chart for a method 500 for providing positioning data to a vehicle moving along a known ground path. At block 501, a database is accessed from an authorized vehicle moving along a known ground path. At block 502, transmit from the database to the authorized vehicle distance and vector information. At block 503 utilize the vehicle distance and vector information to follow the known ground path to an identified endpoint.

Figure 8:
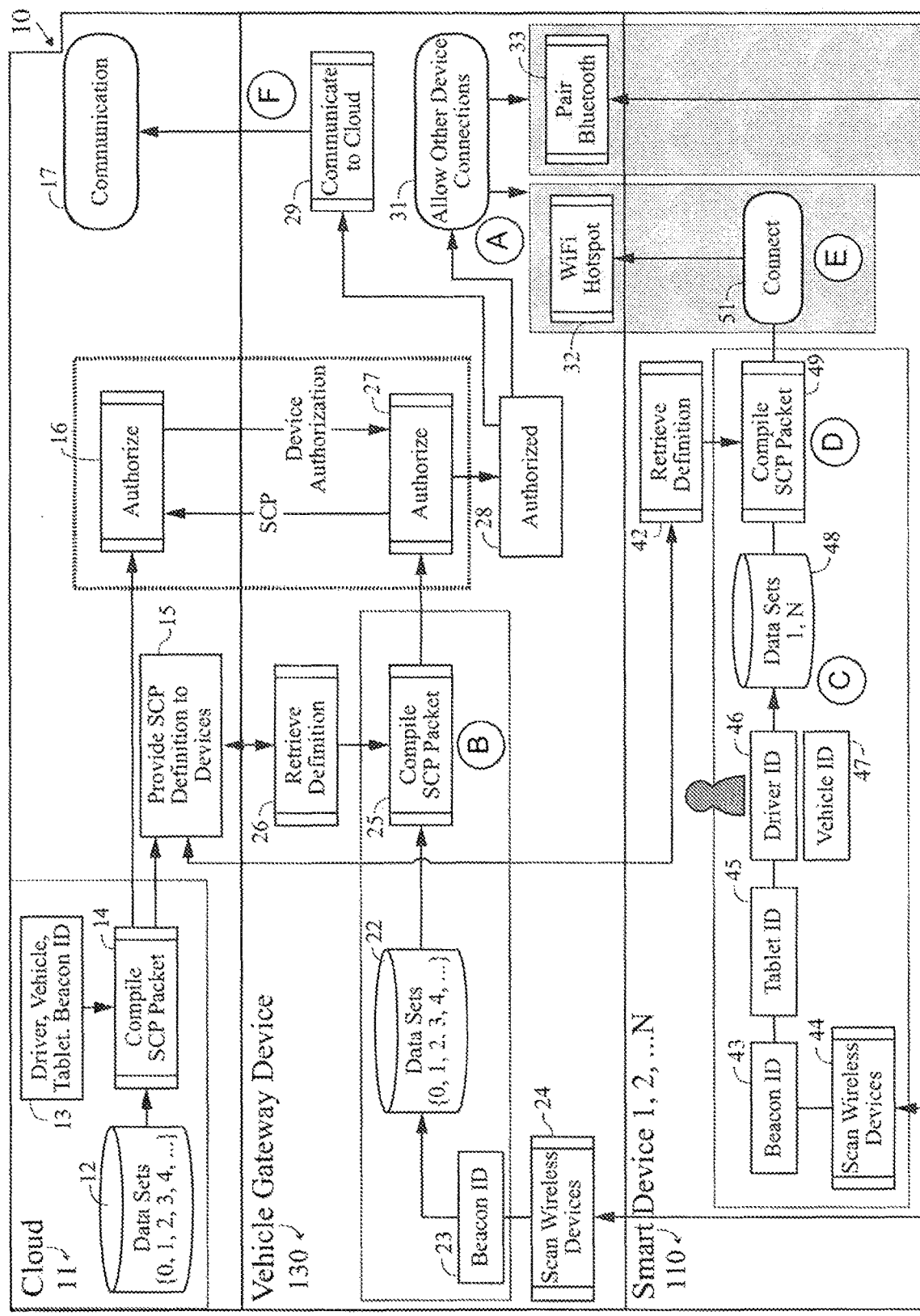
FIG. 8 is a block diagram of system for a secure communication protocol for connecting a wireless device to a single access point in a vehicle.
Figure 8A:
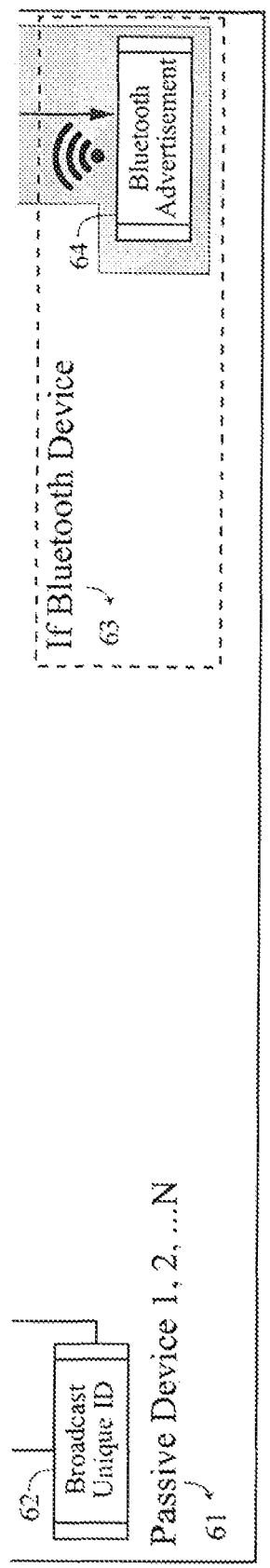
FIG. 8A is a continuation of the block diagram of FIG. 8.

A system 10 for securely connecting a wireless device to a single access point in a vehicle for a predetermined work assignment is shown in FIGS. 8 and 8A. The system 10 preferably comprises a remote server (cloud) 11, a vehicle gateway device 130, a smart device 110 and a passive device 61. The vehicle gateway device 130 is preferably a connected vehicle device ("CVD").

The server/cloud 11 accesses dataset 12 and obtains driver information. Vehicle information, mobile device information (MAC address), passive device information (beacon ID) and other information to compile a SCP packet 14. At block 15, the server 11 provides SCP definitions to the vehicle gateway device 130 and the mobile device 110. At block 16 the server/cloud 11 authorizes the SCP. At block 17, the server/cloud 11 communicates with the vehicle gateway device 130.

The vehicle gateway device 130 uses datasets 22, with the beacon ID 23, a scan of wireless devices 24 along with the SCP definitions 26 received from the server/cloud 11 to compile a CVD compiled SCP packet 25. The CVD compiled SCP packet is sent to the cloud/server 11 at block 16 and authorization/validation of the CVD compiled SCP packet is received at block 27. At block 28 the SCP is authorized for broadcasting at the vehicle gateway device 130 a wireless network with a hidden and hashed SSID unique to the vehicle, the hidden and hashed SSID generated from the validated SCP packet. At block 29, the vehicle gateway device 130 communicates the broadcast with the server/cloud 11. At block 31, the vehicle gateway device 130 communicates with other devices, namely the smart device 110 over preferably a WiFi hotspot 32 and the passive device 61 by pairing using a BLUETOOTH communication protocol at block 33.

At block 49, the smart device (mobile device) 110 compiles a complied mobile device SCP packet from the SCP definitions 42, the data sets 48, the beacon ID 43, the Tablet ID 45, a driver ID 46, a vehicle ID 47 and scan of wireless devices 44. The mobile device 110 generates the hashed SSID and a passphrase from the complied mobile device SCP packet. At block 51, the mobile device 110 connects to the WiFi hotspot 32 of the vehicle device gateway 130.

The passive device 61 broadcast a unique ID at block 62 which is received by the mobile device 110 and the vehicle gateway device 130. At block 63, if a BLUETOOTH device, it broadcasts a BLUETOOTH advertisement at block 64.

The SCP is defined by an assigning authority in the server/cloud 11. The server/cloud 11 sends the SCP definition and any other required data in datasets to the CVD 130 and the mobile device 110. The CVD 130 adds the contextual data from local datasets to the sever-sent data to compile its SCP based definition. The local datasets include data wirelessly scanned from passive devices, preferably transmitting a BLUETOOTH beacon. Other local datasets include information from the vehicle. The CVD 130 sends its compiled SCP packet to the server 11 for authorization. The server 11 verifies the CVD compiled SCP packet, and if valid, the server 11 transmits a validation/approval signal to the CVD 130. The CVD then generates an access point SSID/passphrase with SCP. Likewise, the mobile device 110 utilizes contextual data from local datasets to compile its SCP based on the definitions. The mobile device 110 connects to the access point of the CVD 130 using the SCP. The CVD 130 and the mobile device 110 also connect to the passive device 61 since it is part of the SCP definition.

As used by the assigning authority engine 1105, a predetermined work assignment is a temporal event with a fixed start and completion based on assignable boundary conditions. The assignable boundary condition is at least one of a predetermined time period, a geographical destination, and a set route. Alternatively, the assignable boundary condition is any feature with a beginning and a termination. The assigning authority is performed by a person or persons, who have the appropriate authority and mechanisms to assign specific tasks and assets to a specific vehicle and vehicle operator or custodian, and to assign workflow assignments to same. The predetermined work assignment is assigned to a known person or entity that has its own primary networked device accessible through a password protected user interface, a specific name and password that auto-populates or otherwise automatically satisfies a plurality of credentials requirements, wherein the plurality of credential requirements are automatically available or revoked based on the assignable boundary condition identified in a pairing event.

The CVD 130 preferably broadcasts a WiFi wireless network with a hidden and hashed SSID unique to the host vehicle and protected by a unique, dynamically generated and hashed passphrase. The vehicle ID is entered into an application on the tablet that is then converted to the same hashed SSID and passphrase, which allows the tablet to attempt to connect to the corresponding CVD WiFi network and begin communication.

Figure 9:
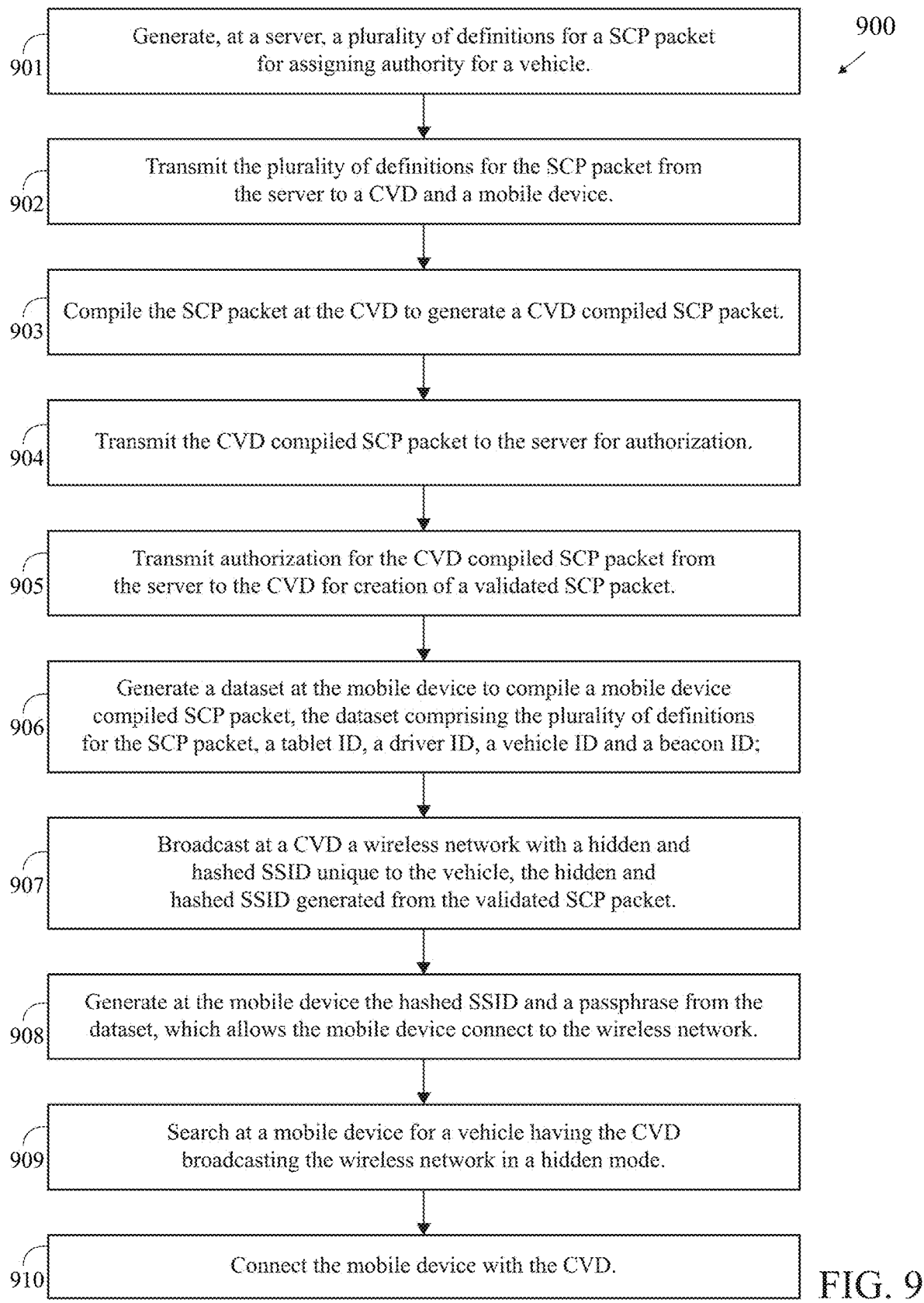
FIG. 9 is a flow chart of a method for a secure connection to a wireless network of a vehicle.

A method 900 for a secure connection to a wireless network of a vehicle is shown in FIG. 9. At block 901, a server generates definitions for a SCP packet for assigning authority for a vehicle. At block 902 the server transmits the definitions for the SCP packet to a CVD and a mobile device. At block 903, the CVD compiles the SCP packet to generate a CVD compiled SCP. At block 904, the CVD transmits the CVD compiled SCP to the server for authorization. At block 905, the server transmits authorization for the CVD compiled SCP from to the CVD for creation of a validated SCP. At block 906, the mobile device generates a dataset to compile a mobile device compiled SCP. At block 907, the CVD broadcasts at a wireless network with a hidden and hashed SSID unique to the vehicle. The hidden and hashed SSID is generated from the validated SCP packet. At block 908, the mobile device generates the hashed SSID and a passphrase from the dataset, which allows the mobile device connect to the wireless network. At block 909, the mobile device searches for a vehicle having the CVD broadcasting the wireless network in a hidden mode. At block 910, the mobile device securely connects with the CVD.

One embodiment utilizes a system for vehicle to mobile device secure wireless communications. The system comprises a vehicle 210, a CVD 130, a mobile device 110 and a passive communication device 61. The vehicle 210 comprises an on-board computer with a memory having a vehicle identification number (VIN), a connector plug, and a motorized engine. The CVD 130 comprises a processor, a WiFi radio, a BLUETOOTH radio, a memory, and a connector for mating with the connector plug of the vehicle. The mobile device 110 comprises a graphical user interface, a mobile application, a processor, a WiFi radio, and a cellular network interface. The passive communication device 61 operates on a BLUETOOTH communication protocol. The server is configured to generate a plurality of definitions for a SCP packet for assigning authority for the vehicle. The server is configured to transmit the plurality of definitions for the SCP packet from the server to the CVD 130 and the mobile device 110. The CVD 130 is configured to compile the SCP packet to generate a CVD compiled SCP. The CVD 130 is configured to transmit the CVD compiled SCP to the server for authorization. The server is configured to transmit authorization for the CVD compiled SCP to the CVD 130 for creation of a validated SCP. The mobile device 110 is configured to generating a dataset to compile a mobile device compiled SCP. The CVD 130 is configured to broadcast a wireless network with a hidden and hashed SSID unique to the vehicle, the hidden and hashed SSID generated from the validated SCP packet. The mobile device 110 is configured to generate the hashed SSID and a passphrase from the dataset, which allows the mobile device connect to the wireless network. The mobile device 110 is configured to search for a vehicle having the CVD broadcasting the wireless network in a hidden mode. The mobile device 110 is configured to connect to the CVD 130 over the wireless network.

The dataset preferably comprises at least one of a plurality of definitions for the SCP packet, a tablet ID, a driver ID, a vehicle ID, a beacon ID, identified or defined entity/participant to the transaction, descriptions, actions, or states of thing, characteristics of identifiable devices, when present in a certain proximity and/or context.

Optionally, the mobile device 110 connects to a passive device, the passive device operating on a BLUETOOTH communication protocol. The passive device 61 is preferably a BLUETOOTH enabled device advertising a unique ID as a beacon or a complex system (speaker, computer, etc.) that emits BLUETOOTH enabled device advertising a unique ID as a beacon.

The mobile device 110 preferably receives input from a driver of the vehicle, and/or the server contains the assigning authority that generates the SCP definitions.

The passive device 61 is preferably an internal device in the vehicle or an external device posted on a gate to a facility and generating a beacon. The beacon from the passive device is preferably a mechanism to ensure that the connection between the mobile device 110 and the CVD 130 occurs at a specific physical location dictated by the assigning authority through the server. Preferably, the automatic connection between the mobile device 110 and the CVD occurs because the assigning authority, through the server, has dictated that it occur.

Figure 10:
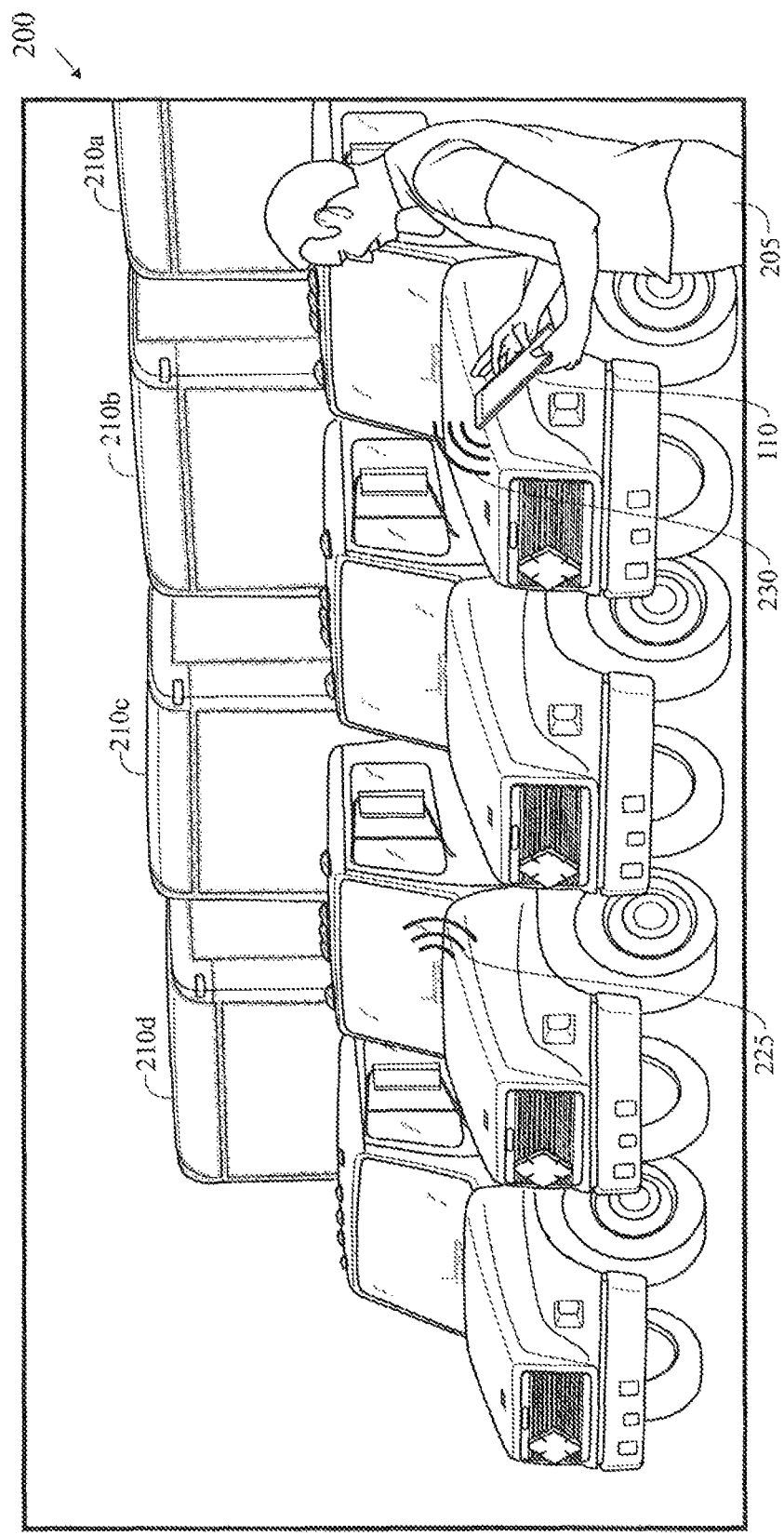
FIG. 10 is an illustration of a driver identifying a vehicle through connection of a tablet computer to an unpublished network.

As shown in FIG. 10, a staging yard for trucks 210a-201d, each of a multitude of trucks 210a-210d broadcast a wireless signal for a truck specific network, with one truck 210c broadcasting a wireless signal 225. However, the SSID is not published so unless a driver is already in possession of the SSID, the driver will not be able to pair the tablet computer 110 with the CVD 130 of the truck 210 to which the driver is assigned. So even though the wireless signals are being "broadcast", they will not appear on a driver's tablet computer 110 (or other mobile device) unless the tablet computer 110 has already been paired with the CVD 130 of the vehicle 210. A driver 205 in possession of a tablet computer 110 pairs, using a signal 230, the tablet computer 110 with the wireless network 225 of the CVD of the truck 210c, and thus the driver locates the specific truck 210c he is assigned to in a parking lot full of identical looking trucks 210a-d.

For example, on an IPHONE® device from Apple, Inc., the "UDID," or Unique Device Identifier is a combination of forty numbers and letters, and is set by Apple and stays with the device forever.

For example, on an ANDROID based system, one that uses Google Inc.'s ANDROID operating system, the ID is set by Google and created when an end-user first boots up the device. The ID remains the same unless the user does a "factory reset" of the phone, which deletes the phone's data and settings.

The mobile communication device 110, or mobile device, is preferably selected from mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet computer from Apple Inc., and the XOOM™ tablet computer from Motorola Mobility Inc.

The mobile communication device 110 then a communication network utilized preferably originates from a mobile communication service provider (aka phone carrier) of the customer such as VERIZON, AT&T, SPRINT, T-MOBILE, and the like mobile communication service providers, provide the communication network for communication to the mobile communication device of the end user.

Wireless standards utilized include 802.11a, 802.11b, 802.11g, AX.25, 3G, CDPD, CDMA, GSM, GPRS, radio, microwave, laser, Bluetooth, 802.15, 802.16, and IrDA.

BLUETOOTH™ technology operates in the unlicensed 2.4 GHz band of the radio-frequency spectrum, and in a preferred embodiment the secondary device 30 and/or primary device 110 is capable of receiving and transmitting signals using BLUETOOTH™ technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5 MH (Band 11, 21, 24); 2300-2700 MHZ (Band 7, 38, 40, 41); 3400-3800 MHZ (Band 22, 42, 43), and in a preferred embodiment the secondary device and/or the primary device 110 is capable of receiving and transmitting signals using one or more of the LTE frequency bands. WiFi preferably operates using 802.11a, 802.11b, 802.11g, 802.11n communication formats as set for the by the IEEE, and in in a preferred embodiment the secondary device and/or the primary device 110 is capable of receiving and transmitting signals using one or more of the 802.11 communication formats. Near-field communications (NFC) may also be utilized.

Figure 11:
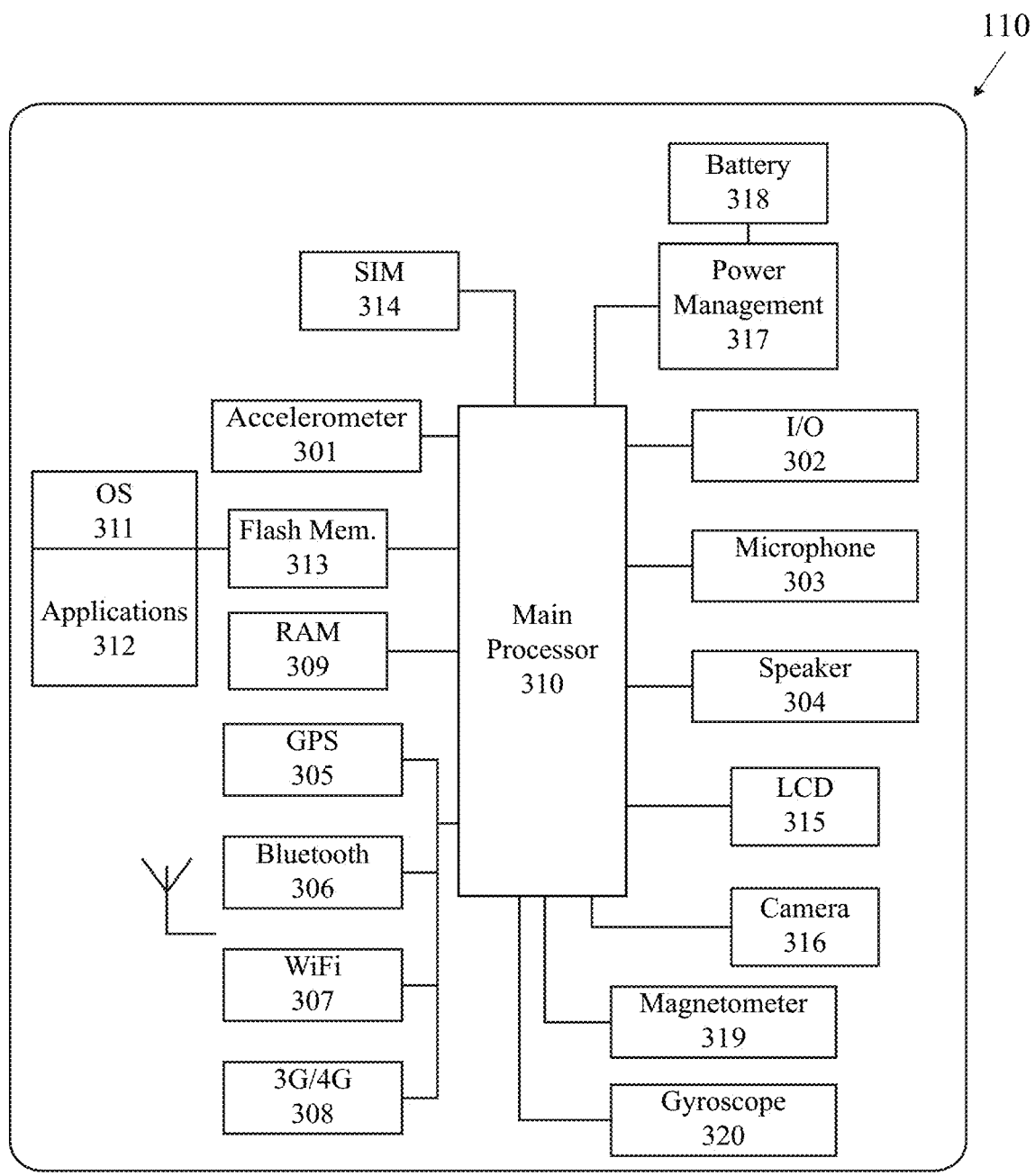
FIG. 11 is an isolated view of general electrical components of a mobile communication device.

As shown in FIG. 11, a typical mobile communication device 110 preferably includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. Databases that may be used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at the cloud server 11, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the authentication server 40 is most preferably HTTPS.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 12:
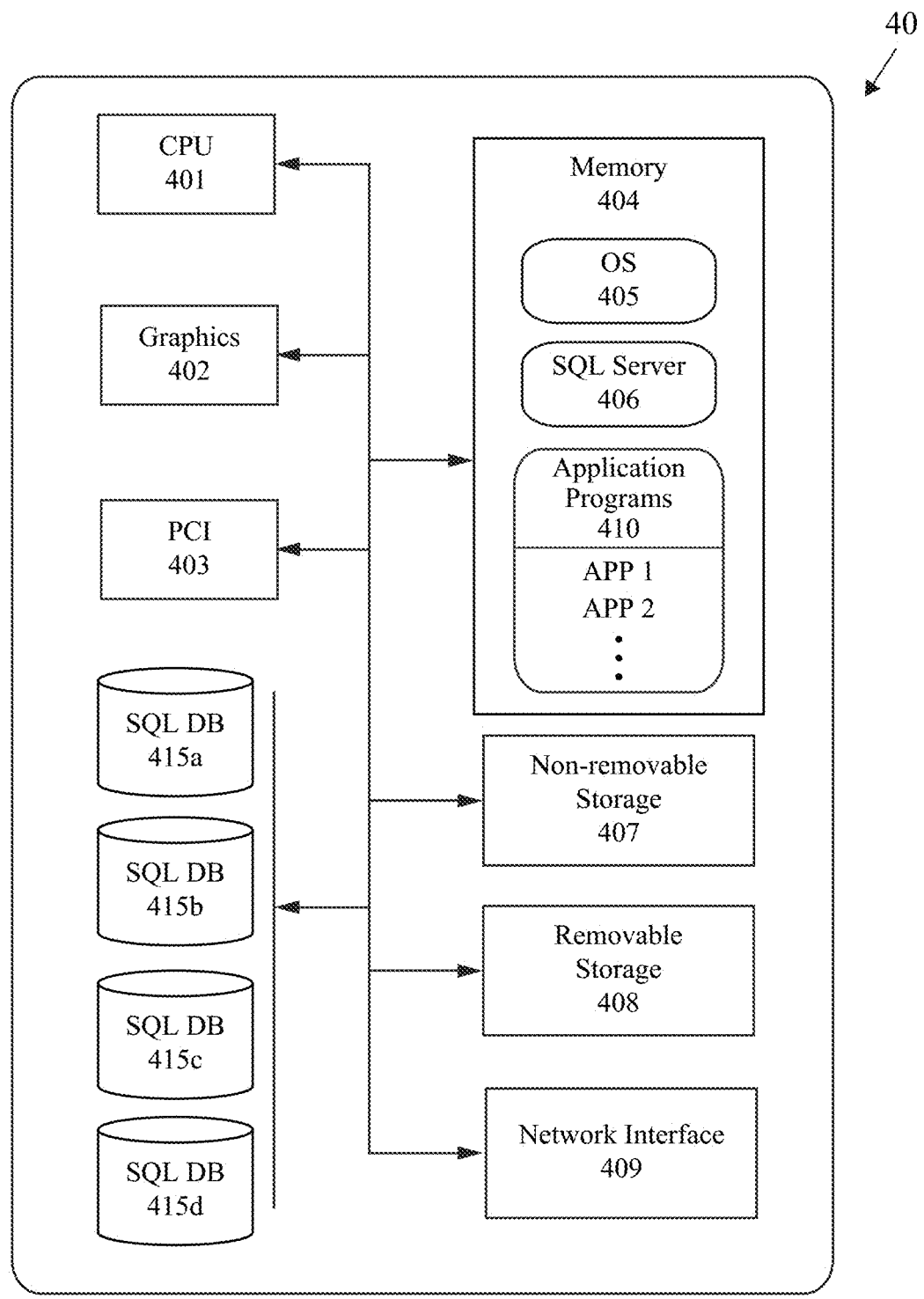
FIG. 12 is an isolated view of general electrical components of a server.

Components of a cloud computing server 40 of the system, as shown in FIG. 12, preferably includes a CPU component 401, a graphics component 402, PCI/PCI Express 403, memory 404, non-removable storage 407, removable storage 408, Network Interface 409, including one or more connections to a fixed network, and SQL database(s) 415a-415d, which includes the venue's CRM. Included in the memory 404, is an operating system 405, a SQL server 406 or other database engine, and computer programs/software 410. The server 40 also preferably includes at least one computer program configured to receive data uploads and store the data uploads in the SQL database 415a-415d. Alternatively, the SQL server 406 can be installed in a separate server from the server 40.

Figure 13:
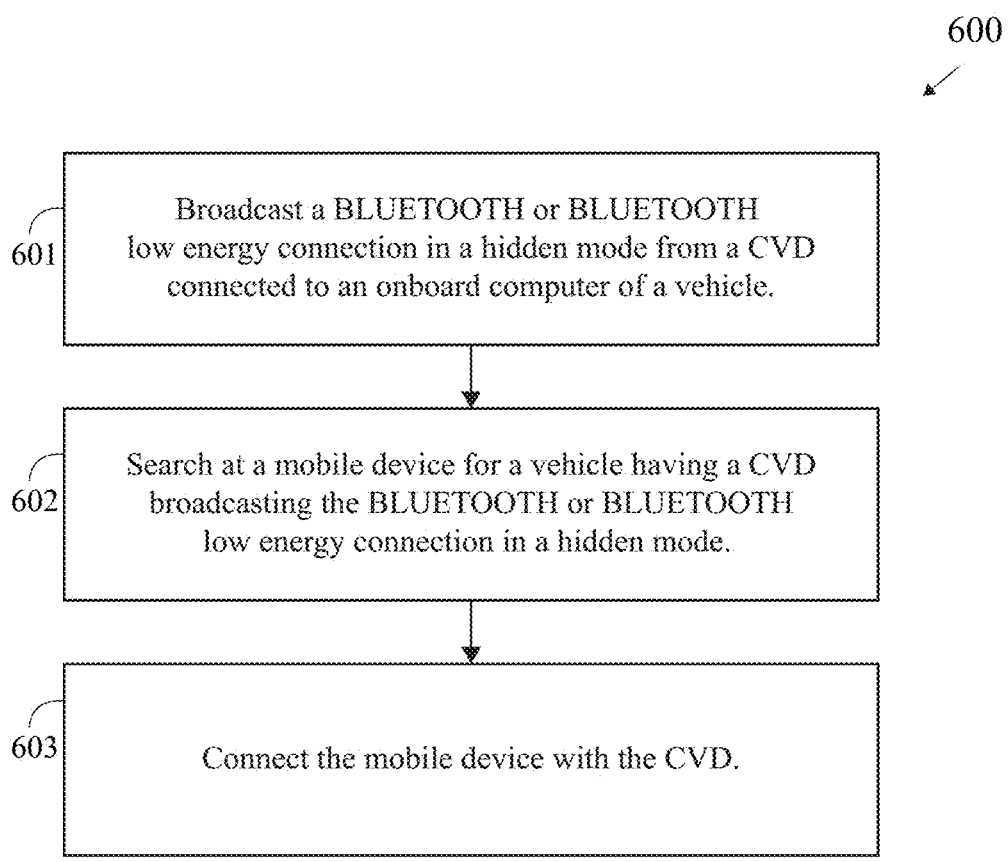
FIG. 13 is a flow chart of method for securely connecting a wireless device to a single access point in a vehicle.

A flow chart for an alternative method 600 for a secure connection to a wireless network of a vehicle is shown in FIG. 13. At block 601, the CVD broadcasts an encrypted, blind SSID based on specific vehicle data. At block 602, leveraging the known vehicle data and the encryption algorithm a mobile device searches for a vehicle having a CVD broadcasting the wireless network. At block 603, the mobile device is connected with the CVD.

Figure 14:
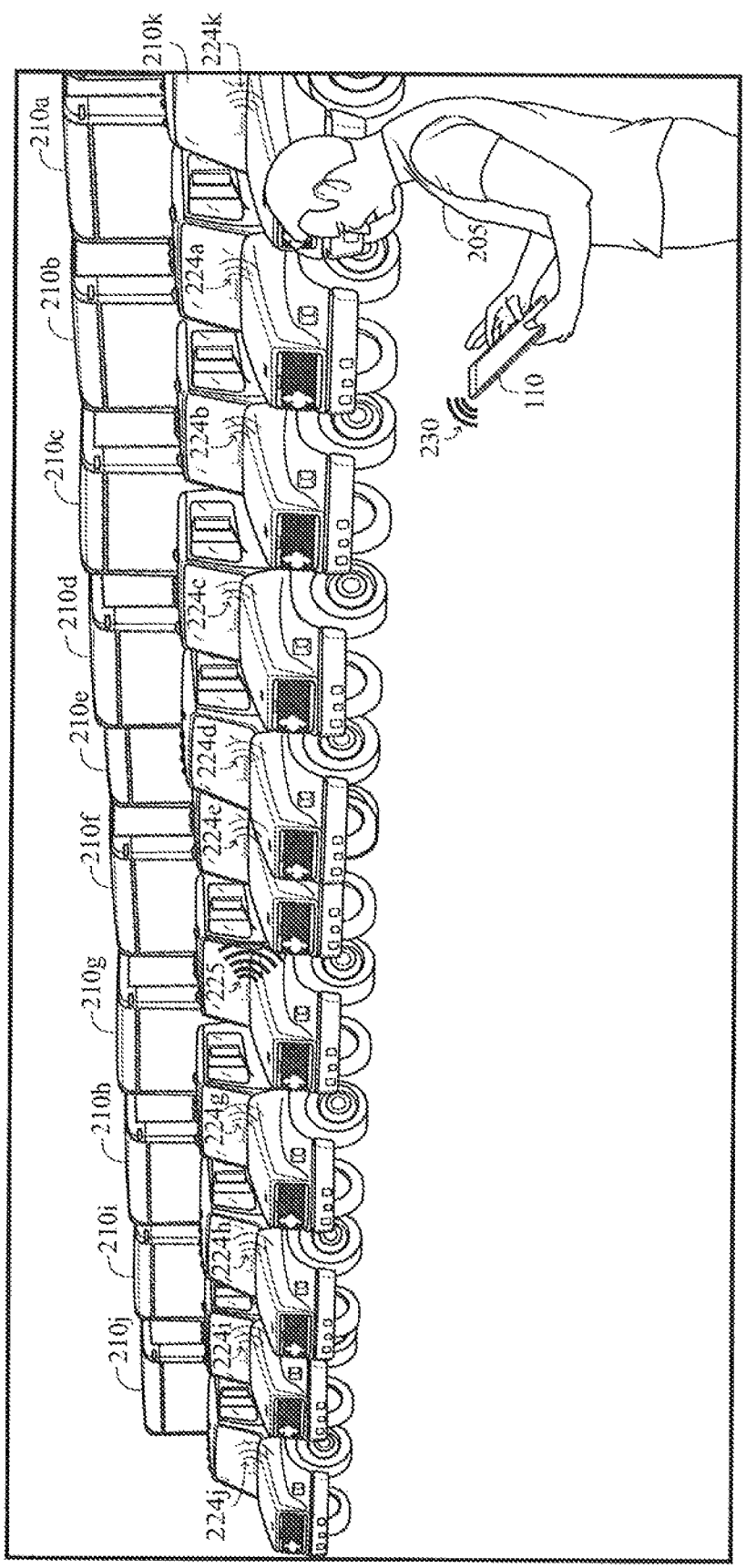
FIG. 14 is an illustration of a driver identifying a vehicle through connection of a tablet computer to an unpublished network.

As shown in FIG. 14, a staging yard for trucks 210a-210k, each of a multitude of trucks 210a-210k broadcast a wireless signal 224a-k for a truck specific network, with one truck 210f broadcasting a wireless signal 225. However, all of the wireless signal 224a-224k and 225 do not publish their respective SSID so that a mobile device 110 must already be paired with the CVD 130 of the truck 210 in order to connect to the truck based wireless network 224a-224k or 225 of each of the CVDs 130 of each of the trucks 210a-210k. A driver 205 in possession of a tablet computer 110 pairs with the specific truck wireless network 225 of the CVD 130 of the truck 210f, and thus the driver locates the specific truck 210f he is assigned to in a parking lot full of identical looking trucks 210a-210k.

One embodiment is a system for utilizing a remote profile manager for vehicle dynamic compliance with multiple vehicle statutes and regulations. The system comprises a truck 210, a CVD 130, a tablet computer 110, a server 1135 and a plurality of databases. The vehicle comprises an on-board computer with a memory having a vehicle identification number (VIN), a connector plug, and a motorized engine. The CVD 130 comprises a processor, a WiFi radio, a BLUETOOTH radio, a memory, and a connector for mating with the connector plug of the vehicle. The tablet computer 110 comprises a graphical user interface, a processor, a WiFi radio, a BLUETOOTH radio, and a cellular network interface. A location of the truck 210 is determined using a GPS component of the truck 210. The location of the truck 210 is transmitted to the server 1135 by the CVD. The server 1135 retrieves real-time compliance rules for the location of the truck from the plurality of databases, which are preferably State vehicle databases, municipal vehicle databases, county vehicle databases, and Federal vehicle databases. The server 1135 transmits the real-time compliance rules to CVD 130 for display on the tablet computer 110 so that a driver of the truck 210 can stay in real-time compliance with State and Federal motor vehicle and driving rules. The rules pertain to speed limits, transport of toxic waste, the transport of refrigerated cargo, the rest durations for drivers, the necessary insurance coverage, the type of taxes and fees to be paid, and the like. The display on the tablet computer is preferably in the form of a visual alert, an audio alert or a haptic alert. Other displays include forms such as attestation forms, and data such as timers, current speed limits, and the like. The trigger for each jurisdiction is preferably from the GPS of the truck 210, the speed of the truck 210, cellular or WiFi triangulation from a network, and the like.

The CVD 130 obtains the vehicle identification number (VIN) from the on-board computer and transmits the VIN with the location to the server 1135 for verification of the truck 210.

Another embodiment is a system for utilizing a remote profile manager 1130 for utilizing multiple vehicle odometer values. The system comprises a vehicle 210, a CVD 130, a tablet computer 110, a server 1135 and a plurality of databases. The vehicle comprises an on-board computer with a memory having a vehicle identification number (VIN), a connector plug, a motorized engine, an odometer component from an engine source, an odometer component from a dashboard source, an odometer component from a chassis source, and an odometer component from a transmission source. Thus, the truck 210 has a multiple of odometers that can be used to determine a mileage of the truck 210. The connected vehicle device (CVD) 130 comprises a processor, a WiFi radio, a BLUETOOTH radio, a memory, and a connector for mating with the connector plug of the vehicle. The tablet computer 110 comprises a graphical user interface, a processor, a WiFi radio, a BLUETOOTH radio, and a cellular network interface. Each of the odometer component from an engine source, the odometer component from a dashboard source, the odometer component from a chassis source, and the odometer component from a transmission source generates an odometer value. The CVD 130 generates a delta value for odometer value relative to a control odometer value. The CVD 130 monitors the odometer value from each of the odometer component from an engine source, the odometer component from a dashboard source, the odometer component from a chassis source, and the odometer component from a transmission source. The CVD 130 generates a new odometer value for one of the odometer component from an engine source, the odometer component from a dashboard source, the odometer component from a chassis source, and the odometer component from a transmission source, and the CVD modifies the odometer value by the delta value to generate the new odometer value.

An operating system controls the execution of other computer programs, running of the PSO platform, and provides scheduling, input-output control, file and data management, memory management, and communication control and related services. The operating system may be, for example Windows (available from Microsoft, Corp. of Redmond, Wash.), LINUX or other UNIX variants (available from Red Hat of Raleigh, N.C. and various other vendors), Android and variants thereof (available from Google, Inc. of Mountain View, Calif.), Apple OS X, iOs and variants thereof (available from Apple, Inc. of Cupertino, Calif.), or the like.

The system and method described in connection with the embodiments disclosed herein is preferably embodied directly in hardware, in a software module executed by a processor, or in a combination of the two. A software module preferably resides in flash memory, ROM memory, EPROM memory, EEPROM memory, RAM memory, registers, a hard disk, a removable disk, a CD-ROM, or any other form of storage medium known in the art. An exemplary storage medium is preferably coupled to the processor, so that the processor reads information from, and writes information to, the storage medium. In the alternative, the storage medium is integral to the processor. In additional embodiments, the processor and the storage medium reside in an Application Specific Integrated Circuit (ASIC). In additional embodiments, the processor and the storage medium reside as discrete components in a computing device. In additional embodiments, the events and/or actions of a method reside as one or any combination or set of codes and/or instructions on a machine-readable medium and/or computer-readable medium, which are incorporated into a computer software program.

In additional embodiments, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium is any available media that is accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection is termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and BLU-RAY disc where disks usually reproduce data magnetically, while discs usually reproduce data optically with lasers. Combinations of the above should also be included within the scope of computer-readable medium.

A computer program code for carrying out operations of the Present Invention is preferably written in an object oriented, scripted or unscripted programming language such as C++, C#, SQL, Java, Python, Javascript, Typescript, PHP, Ruby, or the like.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS"), or other similar protocols. The protocol at the server is preferably HTTPS.

Components of a server includes a CPU component, a graphics component, memory, non-removable storage, removable storage, Network Interface, including one or more connections to a fixed network, and SQL database(s). Included in the memory, is an operating system, a SQL server or other database engine, and computer programs/software.

Kennedy et al., U.S. Pat. No. 11,197,329 for a Method And System For Generating Fueling Instructions For A Vehicle, is hereby incorporated by reference in its entirety.

Kennedy et al., U.S. Pat. No. 10,652,935 for Secure Wireless Networks For Vehicles, is hereby incorporated by reference in its entirety.

Kennedy et al., U.S. Pat. No. 11,330,644 for Secure Wireless Networks For Vehicle Assigning Authority, is hereby incorporated by reference in its entirety.

Kennedy et al., U.S. Pat. No. 10,917,921 for Secure Wireless Networks For Vehicles, is hereby incorporated by reference in its entirety.

Son et al., U.S. Pat. No. 10,475,258 for a Method And System For Utilizing Vehicle Odometer Values And Dynamic Compliance, is hereby incorporated by reference in its entirety.

Son et al., U.S. Pat. No. 10,070,471 for a Secure Wireless Networks For Vehicles, is hereby incorporated by reference in its entirety.

Son et al., U.S. Pat. No. 10,652,935 for a Secure Wireless Networks For Vehicles, is hereby incorporated by reference in its entirety.

Kennedy et al., U.S. Pat. No. 11,197,330 for a Remote Profile Manager For A Vehicle, is hereby incorporated by reference in its entirety.

Kennedy et al., U.S. Pat. No. 11,197,329 for a Method And System For Generating Fueling Instructions For A Vehicle, is hereby incorporated by reference in its entirety.

Kennedy et al., U.S. Pat. No. 11,503,655 for a Micro-Navigation For A Vehicle, is hereby incorporated by reference in its entirety.

Kennedy et al., U.S. Pat. No. 11,528,759 for a Method And System For Vehicle Inspection, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:
1. A system to generate position and state-based electronic signaling from a vehicle, the system comprising:
 a vehicle comprising an authorized wireless device;
 an assigning authority engine for authorizing actions for the vehicle residing at a server;
 a processor;
 at least one on-board sensor selected from an odometer, a RPM indicator, a gear position, or a speedometer; and
 at least one positioning capturing device, wherein the at least one positioning capturing device is a GPS, magnetometer, accelerometer, odometer and speedometer derived, or hybrid calculated values;
 wherein the processor is configured to compare an on-vehicle re-creation of a traveled ground path of the vehicle as described by the vehicle's location as reported by the at least one position capturing device; and
 wherein the processor is configured to report the plurality of ground path descriptions in a format of ascending or descending values determined by a number of user-defined increments away from a specific user selected geospatial zero point, to a pre-selected route selected from an authorized database by the assigning authority.
2. The system according to claim 1 wherein the processor resides at a server, a CVD or an authorized mobile device.
3. The system according to claim 1 wherein the system is configured to interact with the plurality of authorized databases containing reference source information that is com- pared to dynamically generated information provided by the authorized wireless device connected to a secure onboard network of the vehicle.

\* \* \* \* \*